United States Patent
Obayashi

[11] Patent Number: 6,078,976
[45] Date of Patent: Jun. 20, 2000

[54] BRIDGE DEVICE THAT PREVENTS DECREASE IN THE DATA TRANSFER EFFICIENCY OF BUSES

[75] Inventor: Yoshimasa Obayashi, Kyoto, Japan

[73] Assignee: Matsushita Electric Industrial Co., Ltd., Japan

[21] Appl. No.: 09/102,685

[22] Filed: Jun. 23, 1998

[30] Foreign Application Priority Data

Jun. 24, 1997 [JP] Japan .................................. 9-167332
Mar. 23, 1998 [JP] Japan ................................ 10-074706

[51] Int. Cl.[7] ................................................... G06F 13/40
[52] U.S. Cl. .............................. 710/128; 710/52; 710/113
[58] Field of Search .................................. 710/100, 101, 710/52, 113–130, 240–244

[56] References Cited

U.S. PATENT DOCUMENTS

| | | |
|---|---|---|
| 4,939,643 | 7/1990 | Long et al. . |
| 5,546,546 | 8/1996 | Bell et al. . |
| 5,584,033 | 12/1996 | Barrett et al. ........................... 710/105 |
| 5,659,718 | 8/1997 | Osman et al. . |
| 5,768,548 | 6/1998 | Young et al. ............................ 710/129 |
| 5,778,236 | 7/1998 | Gephardt et al. ....................... 710/266 |
| 5,857,082 | 1/1999 | Murdoch et al. ....................... 710/128 |

OTHER PUBLICATIONS

"Digital Semiconductor 21152 PCI–toPCI Data Sheet," Digital Equipment Corporation, Maynard, MA, Sep. 1997.

*Primary Examiner*—Xuan M. Thai
*Attorney, Agent, or Firm*—Price, Gess & Ubell

[57] ABSTRACT

When the use of a receiver the bus is not be acquired in delayed read or posted write, the length of a burst data transfer is limited by the capacity of the buffer in a bridge device. In order to solve this problem, waits are inserted in data output process via a sender bus in delayed read or posted write according to the condition of the receiver bus. As a result, input rate of data into the buffer in the bridge device is kept constant, and the use of the receiver bus can be acquired in the delayed read or the posted write. Data is simultaneously transferred into and from the buffer in the bridge device, so that the probability of burst data transfer with a long burst data transfer length is increased.

16 Claims, 11 Drawing Sheets

BRIDGE DEVICE THAT PREVENTS DECREASE IN THE DATA TRANSFER EFFICIENCY OF BUSES

BACKGROUND OF THE INVENTION

1. Field of the Invention

The present invention relates to a bridge device that connects a plurality of buses included in a computer system.

2. Description of the Prior Art

In recent years, many computer systems have been developed where a single or several processor(s) is/are made to access as large a number of peripherals as possible to improve both the function and performance of the system. A plurality of local buses are installed in such a computer system, with a plurality of peripherals being connected to the local buses. In such topology, the peripherals are provided away from the processor with the local buses acting as the main routes. When reading and writing data, the processor transfers to and from the peripherals on buses and between buses. As a result, when the processor reads or writes data, the functioning and the performance of the computer system are affected by the data transfer rate on buses and between buses. often used in a computer system in which the above-mentioned topology is adopted. The PCI bus is explained in detail in PCI Local bus Specification, Rev. 2.1.

PCI buses are characterized by performing address transfer and data transfer using 32 signal lines according to time division multiplexing. Stream type data that is stored in consecutive addresses in the memory of a peripheral is transferred with high speed to another peripheral by multiplexing data transfer. The real value of such high speed transfer can be felt when transferring a large amount of data, for instance, an MPEG (Motion Picture Expert Group) video stream that occupies several dozen megabytes on a hard disk.

The methods by which devices (hereinafter a processor or a peripheral will be called a "device") in the computer system use the local buses is explained below. When transferring data via a local bus, a device needs to acquire the use of the local bus. A dedicated device called a arbitration unit that is installed for each PCI bus gives the use of the local bus to one of the devices in a PCI bus type computer system. The use of a local bus is explained below.

1. The acquirement of the Use of a Local Bus

The use of a local bus is given to one device after the device transfers a request signal that requests the use of the local bus (hereinafter abbreviated as an "REQ signal") to the arbitration unit and receives a grant signal that is output from the arbitration unit (hereinafter abbreviated as a "GNT signal").

After acquiring the use of the local bus as described above, the device transfers the address first when the local bus is idle, and then transfers data after asserting both the master data transfer ready signal (hereinafter called as the "IRDY (Initiator Ready) signal") and the target data transfer ready signal (hereinafter called as the "TRDY (Target Ready) signal").

2. Burst Data Transfer

An address and data are multiplexed via a local bus, so that an address and data are transferred in sequence. Such a kind of transfer is called "burst data transfer", and the number of pieces of data that are transferred in one "burst data transfer" is called the "burst data transfer length".

3. Lapse of a Use

The use acquired by one device lapses when a "STOP signal" is output the target device to which data is to be transferred. The "STOP signal" represents the stop of data transfer, and is output when the target device has not finished preparing for data transfer or when ongoing data transfer cannot be continued.

A timeout of the latency timer in the device that requests the use also causes the use of a local bus to lapse. The latency timer is a timer that sets the maximum period of time for which the requesting device can occupy the bus. The latency timer starts a countdown from a predetermined initial value just after the use of the bus commences, so that when the numerical value becomes "0", the use of the master device lapses if the GNT signal to the requesting device itself has been deasserted.

4. The Re-Acquirement of the Use of a Local Bus

When the use of a local bus lapses without data transfer having been completed, the requesting device stops the data transfer, releases the local bus, and retries the data transfer process starting from the acquirement of the use of the local bus. The interruption of data transfer by a STOP signal is called a "retry termination", and the continuation of data transfer after the "retry termination" is called a "retry operation".

In general, when data is transferred using a single local bus, the use of the local bus is acquired in the process that has been described. It should be noted here that the maximum number of devices that may be connected to one local bus is about five, considering the electrical load and stability. When a computer system needs to include more than the maximum number of devices, a plurality of local buses need to be installed in the computer system, with bridge devices being installed between the local buses. The devices in the computer system read and write data via the bridge devices.

Data transfer via a bridge device that is installed between two local buses in such a extended computer system is explained below.

1. Data Read via a Bridge Device

When a first device connected to a first local bus requests to read data from a second device connected to a second local bus, the bridge device acquires the use of the second local bus, and requests to read data from the second device connected to the second local bus in place of the first device, and cancels the use of the first local bus by the first device. Until the first device (hereinafter called the "master device") acquires the use of the first local bus again, data is sequentially read from the second device (hereinafter called the "target device"). The bridge device stores the data read from the target device in its internal buffer. When the master device acquires the use of the first local bus again, the bridge device sequentially outputs the data stored in the internal buffer to the master device. Such data read via a bridge device is called "delayed read".

2. Data Write via a Bridge Device

When a first device connected to a first local bus requests to write data in a second device connected to a second local bus, the bridge device acquires the use of the second local bus and request to write data in the target device in place of the master device. When the master device acquires the use of the first local bus, the data that is to be written in the target data is sequentially output from the master device. The bridge device stores the data output from the master device in its internal buffer. When acquiring the use of the second local bus, the bridge device sequentially outputs the stored data to the target device. Such data write via a bridge device is called "posted write".

As described above, both in delayed read and posted write, the data output from one of the devices is temporarily stored in the buffer in the bridge device. Accordingly, when the capacity of the buffer is relatively large, the period of time taken to fill the buffer with data is relatively long. As a result, the probability that the secondly use of a local bus will be acquired before the buffer is full is relatively high, meaning that delayed reads or posted writes may be performed smoothly.

When the buffer is filled before the second use of a local bus is acquired, the bridge device has to stop the data transfer, and the master device has to give up the first use of a local bus. Under the circumstances, the delayed read or the posted write need to be restarted from scratch. Should the bridge device repeatedly have to restart data transfers from scratch, a large number of devices will have to wait to acquire the use of local buses. As a result, the local buses will be always used highly inefficiently.

Though a larger capacity for the buffer may appear to improve the efficiency with which the local buses are used, increases in this capacity are problematic. This is because the buffer in a bridge device must be an expensive BI-CMOS-type to simultaneously input and output data. The cost of such memory places a restriction on buffer capacity, so that the capacity of the buffer is usually small.

It is normally possible for a device to transfer up to 64 double words of data in one burst data transfer. More, one double word represents 32 bits, and it is possible for a PCI bus with 32 bit width to transfer one double word of data in one clock cycle when overheads, such as for address transfer, are ignored. A bridge device includes a buffer with a capacity much smaller than 64 double words. As one example, the capacity of the buffer for delayed read in a 21152-type bridge device manufactured by DIGITAL EQUIPMENT CORPORATION is 18 double words. With such a buffer, a device that can transfer 64 double words of data in one burst data transfer has to acquire the use of a label bus four times and perform four burst data transfers to read 64 double words of data.

The capacity of the buffer for the posted write is no more than 22 double words of data including an address. Under the circumstances , a device that can transfer 64 double words of data in one burst data transfer has to acquire the use of a local bus three times and perform three burst data transfers to output 64 double words or data.

SUMMARY OF THE INVENTION

The object of the present invention is to provide a bridge device that improves the efficiency of the use of a bus by preventing the input of data that is to be transferred into a buffer from stopping halfway and the start of the data input from scratch from being repeated.

The above-mentioned object is achieved by a bridge device in bridge device that is installed in a computer system that includes: a sender bus that performs data transfer at a maximum transfer rate equal to a first transfer rate and is connected to a send device that outputs data; a receiver bus that performs data transfer at a maximum transfer rate equal to the first transfer rate and is connected to a receive device that receives the data; and arbitration unit that performs arbitration between devices when assigning uses of the sender bus and the receiver bus, the bridge device may including: request signal output unit for outputting, when the sender device acquires the use of the sender bus, a request signal for requesting the use of the receiver but to the arbitration unit; transfer rate reduction unit for reducing, when the bridge device has to wait to acquire the use of the receiver bus as a result of arbitration by the arbitration unit, a transfer rate on the sender bus from the first transfer rate to a second transfer rate that is lower than the first transfer rate; a buffer for reading and storing data that is transferred via the sender bus; transfer rate return unit for having the transfer rate on the sender bus return to the first transfer rate when the bridge device acquires the use of the receiver bus; and output unit for outputting data stored in the buffer to the receiver bus according to a FIFO (First-In First-Out) order.

When the capacity of the buffer in the bridge device is small and the use of the receiver bus is not acquired, the bridge device may decrease the transfers rate of the data via the sender bus. As a result, the time taken to fill the buffer with data may be extended, so that the probability that the master device succeeds in acquiring the use of the receiver bus may be increased while data is input into the buffer. When the use of the receiver bus is acquired, the data transfer rate via the sender bus is returned to the original rate. By doing so, the effect of the decreased data transfer rate may be limited to minimum.

When the device has the ability to perform one burst data transfer with a long burst data transfer length, and when the capacity of buffer is much smaller than the burst data transfer length, the burst data transfer may not be stopped by the bridge device.

By preventing burst data transfer from stopping, an MPEG image stream that occupies scores of megabytes of consecutive addresses on a hard disk may be transferred efficiently.

The object may be also achieved by the bridge device, wherein the bridge device is connected to the sender device on the sender bus by a control line, the control line showing one of a transferrable condition where the bridge device is able to receive data output from the sender device and a non-transferrable condition where the bridge device is unable to receive data output from the sender device, the transfer rate reduction unit includes a delay control unit for inserting, when the bridge device waits to acquire the use of the receiver bus as a result of arbitration by the arbitration unit, wait cycles into the data output process of the sender device by switching a condition of the control line into the non-transferrable condition and switching the condition of the control line from the non-transferrable condition into the transferrable condition after waiting for a first predetermined period of time, and the transfer rate return unit includes a first switch unit for switching the condition of the control line to the transferrable condition when the bridge device acquires the use of the receiver bus.

When the device has the ability to perform one burst data transfer with a long burst data transfer length, and when the capacity of buffer is much smaller than the burst data transfer length, the burst data transfer may not be stopped by the bridge device in the computer system in which data is transferred according to the transfer sequence where the data stored in the buffer is output after an IRDY or TRDY signal is output.

The object may be also achieved by the bridge device, wherein the sender device includes a storage resource that stores data, and reads data stored in the storage resource and outputs the data to the sender bus when a read command is output, and the receiver device outputs a read command, and when data that the read command requests is output to the receiver bus, receives the output data, the bridge device may further including: reception unit for receiving a read command from the receiver device, the read command identifying the sender device as the data source; and output instructing unit for receiving a read command and instructing the sender device to read the data stored in the storage resource and to output the read data to the receiver bus, wherein the request signal output unit outputs, when the sender device acquires the use of the sender bus, a request signal for requesting the use of the receiver bus to the arbitration unit, and the transfer rate reduction unit reduces, when the bridge device has to wait to acquire the use of the receiver bus as a result of arbitration by the arbitration unit, a transfer rate on the sender bus from the first transfer rate to a second transfer rate that is lower than the first transfer rate.

When the device has the ability to perform one burst data transfer with a long burst data transfer length, and when the capacity of buffer is much smaller than the burst data transfer length, the burst data transfer may not be stopped by the bridge device even when the burst data transfer is typical delayed read.

The object may be also achieved by the bridge device, wherein the sender bus and the receiver bus are PCI (Peripheral Component Interconnect) buses, the control line is an IRDY (Initiator Ready) signal line, the second predetermined time and the third predetermined time are seven clock cycles, and the second switch unit and the third switch unit switch the condition of the control line to the transferrable condition by asserting the IRDY signal.

When the device has the ability to perform one burst data transfer with a long burst data transfer length, and when the capacity of buffer is much smaller than the burst data transfer length, the burst data transfer may not be stopped by the bridge device in the computer system in which PCI buses are installed as main routes.

The object may be also achieved by the bridge device, wherein the receiver device includes a storage resource in which data is to be written according to a write command, and when a write command in which the receiver device is indicated as a data destination is output, receives data transferred to the receiver bus and writes the transferred data in the storage resource, and the sender device outputs a write command and data that is to be written in the receiver to the sender bus according to the write command simultaneously, the bridge device may further including: reception unit for receiving a write command from the sender device, the write command indicating the receiver device as the data destination; and output instructing unit for receiving a write command and instructing the sender device to read data to be written and to output the read data to the sender bus, wherein the request signal output unit outputs, when the sender device acquires the use of the sender bus, a request signal for requesting the use of the receiver bus to the arbitration unit, and the transfer rate reduction unit reduces, when the bridge device has to wait to acquire the use of the receiver bus as a result of arbitration by the arbitration unit, a transfer rate on the sender bus from the first transfer rate to a second transfer rate that is lower than the first transfer rate.

When the device has the ability to perform one burst data transfer with a long burst data transfer length, and when the capacity of buffer is much smaller than the burst data transfer length, the burst data transfer may not be stopped by the bridge device even when the burst data transfer is typical post write.

The object may be also achieved by the bridge device that may further including: a timer for counting, when the receiver bus is occupied by a device apart from the receiver device, a time elapsed after the device apart from the receiver device acquires the use of the receiver bus; and stop signal output unit for outputting, when the bridge device waits to acquire the use of the receiver bus as a result of the arbitration by the arbitration unit and a fourth predetermined period of time has passed since the device apart from the receiver device acquired the use of the receiver bus, a stop signal to the device apart from the receiver device.

When the period of time during which a device apart from the receiver device occupies the receiver bus exceeds a predetermined time, the bridge device may output a STOP signal to the device that occupies the receiver bus. By doing so, the receiver bus may be forced to be idle. As a result, one burst data transfer may be performed without interruption.

The object may be also achieved by the bridge device, wherein the stops signal output unit outputs, when a further device apart from the receiver device outputs the request signal before the receiver device, the stop signal to the receiver device apart from the receiver device.

When the use of a bus is acquired after a REQ signal is output and a GNT signal is acquired, the use may be newly acquired by the device to which the REQ signal is preferentially output.

BRIEF DESCRIPTION OF THE DRAWINGS

These and other objects, advantages and features of the invention will become apparent from the following description thereof taken in conjunction with the accompanying drawings which illustrate a specific embodiment of the invention. In the Drawings.

DESCRIPTION OF THE PREFERRED EMBODIMENTS

Computer systems in which a bridge device is installed are described below as the embodiments of the bridge device of the present invention. To simplify the explanation, the operations of the components in the computer system during a delayed read are explained as the first embodiment, and the operations during a posted write are explained as the second embodiment.

The First Embodiment

Figure 1:
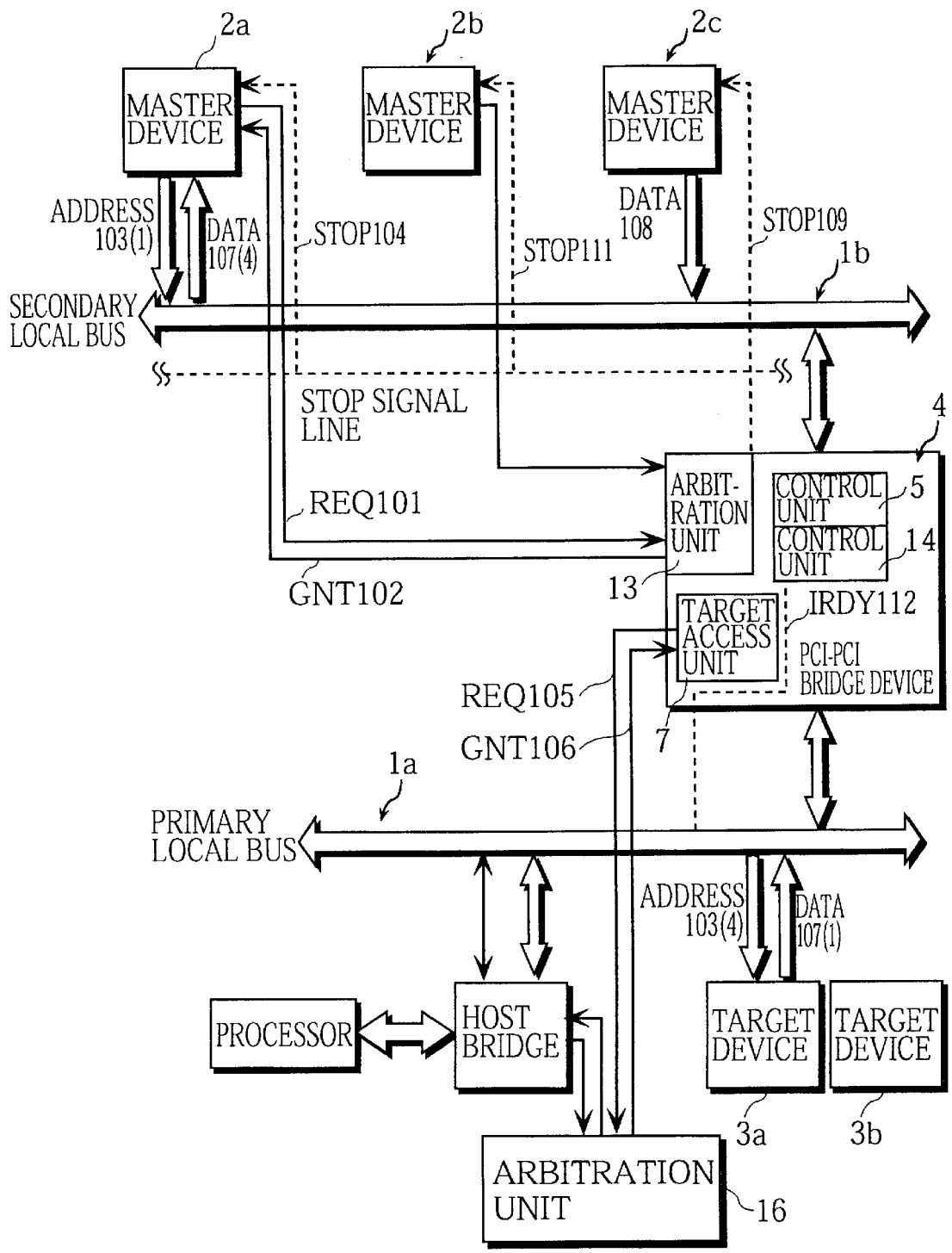
FIG. 1 shows an overall construction of a computer system according to the first embodiment of the present invention.
Figure 2:
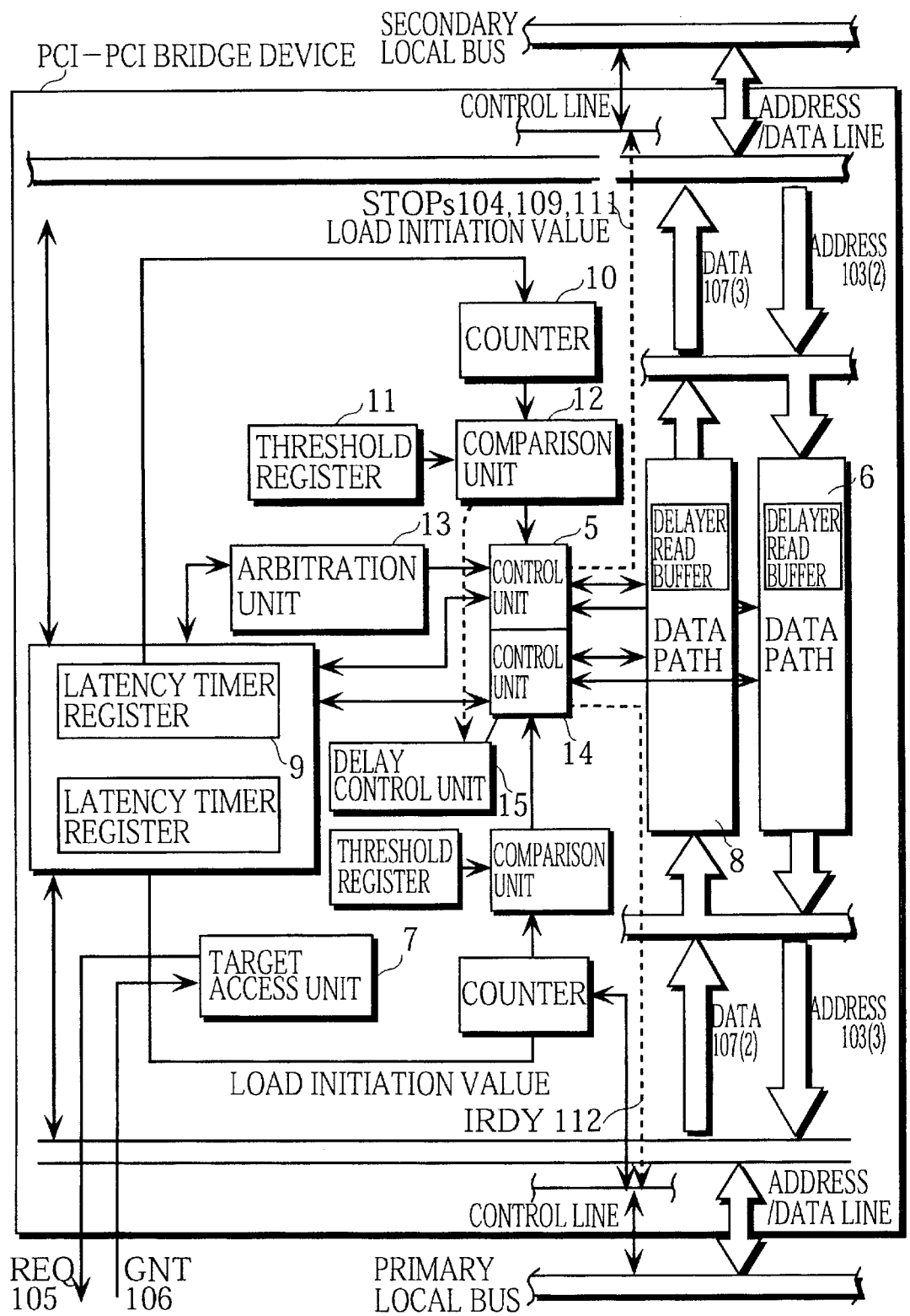
FIG. 2 shows a construction of PCI-PCI bridge device 4 in the computer system according to the first embodiment of the present invention.

FIG. 1 shows the overall construction of the computer system in which PCI-PCI bridge device 4 connects two PCI buses. FIG. 2 shows the internal construction of PCI-PCI bridge device 4. FIG. 1 is referred to when the overall construction of the computer system is described, while FIG. 2 is referred to when the components of PCI-PCI bridge device 4 are described in detail. In these figures, the control signals are given reference numbers in the 100s to distinguish them from the components. The control signals that appear in different places in FIGS. 1 and 2, such as, ADDRESS 103 or DATA 107, are given sub-reference numbers (1), to (4) according to the order in which they appear.

FIG. 1 shows that the computer system includes target local bus 1a, master local bus 1b, master devices 2a, 2b, and 2c, target devices 3a and 3b, PCI-PCI bridge device 4, and arbitration unit 16. FIG. 1 also shows that PCI-PCI bridge device 4 includes control units 5 and 14, target access unit 7, and arbitration unit 13.

FIG. 2 shows that PCI-PCI bridge device 4 includes control units 5 and 14, data paths 6 and 8, target access unit 7, latency timer register 9, counter 10, threshold register 11, comparison unit 12, arbitration unit 13, control unit 14, and delay control unit 15.

Primary local bus 1a, which is shown only in FIG. 1, is a PCI bus. A host bridge, arbitration unit 16, and devices 3a and 3b are connected to primary local bus 1a.

Secondary local bus 1b, which is shown only in FIG. 1, is also a PCI bus. Master devices 2a, 2b, and 2c are connected to secondary local bus 1b.

Primary local bus 1a and the connected devices are symmetric to secondary local bus 1b and the connected devices with respect to PCI-PCI bridge device 4. In the first embodiment, in which the operations of the components in delayed read are described, secondary local bus 1b and the connected devices are set as the master side, and primary local bus 1a and the connected devices are set as the target side.

Master device 2a, 2b, or 2c in FIG. 1 waits for the user to designate the target device from which data should be read and to give a read instruction. On receiving the designation and the instruction, master device 2a, 2b, or 2c transfers a request to acquire the use of secondary local bus 1b (for instance, REQ 101 in FIG. 1) to arbitration unit 13. After outputting the request, master device 2a, 2b, or 2c waits for an enabling signal from arbitration unit 13 (for instance, GNT 102 in FIG. 1). On receiving the enabling signal and acquiring the use of secondary local bus 1b, master device 2a, 2b, or 2c outputs the address of the target device from which the data should be read to secondary local bus 1b and a read command to PCI-PCI bridge device 4 via a control line that is not shown in FIG. 1. In the computer system, an address given in a memory-mapped I/O format is assign to each device connected to primary local bus 1a and secondary local bus 1b. When such an address is output, for instance, as shown as signal 103 (1), master device 2a, 2b, or 2c waits for the data that secondary local bus 1b has been requested to transfer to appear on secondary local bus 1b. When control unit 5 outputs a STOP signal before the appearance of the data, the use acquired by master device 2a, 2b, or 2c lapses. In this case, after releasing secondary local bus 1b, master device 2a, 2b, or 2c performs a "retry operation", that is by outputting the request signal again and reacquiring the use of secondary local bus 1b. When reacquiring the use of secondary local bus 1b, outputting read command to PCI-PCI bridge device 4 again, and finding that the requested data appears on secondary local bus 1b, master device 2a, 2b, or 2c reads the data as shown as DATA 107(4).

In this example, master device 2a out of master devices 2a to 2c is set as the master of image stream transfer among. Here, delayed reads which involve the master of image stream transfer are given priority over delayed reads in which other devices are involved.

PCI-PCI bridge device 4 acquires the use of primary local device 1a and requests to read the data for a master device that is connected to secondary local bus 1b when the master device requests to read data from a target device that is connected to primary local bus 1a. Until the master device succeeds in acquiring the use of secondary local device 1b, data is continuously read from the target device. PCI-PCI bridge device 4 stores the data read from the target device in its internal buffer. When the master device succeeds in acquiring the use of secondary local device 1b, PCI-PCI bridge device 4 sequentially outputs the data stored in the internal buffer to the master device.

Control unit 5 outputs a STOP signal to secondary local bus 1b to end the use of secondary local bus 1b by the master device when the master device that is connected to secondary local bus 1b acquires the use of secondary local bus 1b, and transfers the address of the target device. More specifically, when master device 2a transfers ADDRESS 103 to secondary local bus 1b, control unit 5 outputs STOP 104 to master device 2a and lapses the use of secondary local bus 1b by master device 2a. Since the use of secondary local bus 1b lapses, master device 2a ends up performing a retry operation. While STOPs 104, 109, and 111 are respectively used for master devices 2a, 2b, and 2c in FIG. 1, one STOP signal that is set for one local bus is commonly used for the master devices connected to the local bus.

Data path 6 shown only in FIG. 2 includes a delayed read buffer for temporarily storing data. When master device 2a, 2b, or 2c outputs the address of the target device to secondary local bus 1b, data path 6 stores the address in the delayed read buffer. At the same time, data path 6 waits for PCI-PCI bridge device 4 to acquire the use of primary local bus 1a. When PCI PCI bridge device 4 acquires the use of primary local bus 1a, data path 6 outputs the address stored in the delayed read buffer to primary local bus 1a.

ADDRESS 103(1) that has been output from master device 2a is stored in the delayed read buffer as shown as ADDRESS 103(2). When PCI-PCI bridge device 4 acquires the use of primary local bus 1a, ADDRESS 103(2) is output to primary local bus 1a as shown as ADDRESS 103(3).

When data path 6 starts the process for storing an address in the delayed read buffer, target access unit 7 tries to acquire the use of primary local bus 1a to which the address should be transferred. In other words, target access unit 7 outputs an REQ signal to arbitration unit 16, which is the arbitrator for local bus 1a. Once arbitration unit 16 outputs an enabling signal, that is, when target access unit 7 has succeeded in acquiring the use of primary local bus 1a, it is then possible for data path 6 to output the address to primary local bus 1a. As described above, control unit 5 outputs STOP 104 to end the use of secondary local bus 1b by master device 2a. As a result, data may be transferred from target device 3a to PCI-PCI bridge device 4, with master device 2a needing to continuously use secondary local bus 1b.

The above described process is described below using the control signals shown in FIG. 1. Just after data path 6 starts to store ADDRESS 103, target access unit 7 outputs REQ 105 to arbitration unit 16, which is the arbitrator for primary local bus 1a, to acquire the use of primary local bus 1a. When arbitration unit 16 outputs GNT 106 after accepting REQ 105, target access unit 7 succeeds in acquiring the use of primary local bus 1a.

When the address of target device 3a or 3b is output to primary local bus 1a, when an IRDY signal is asserted, and when a read command is output using a control line that is not shown in FIG. 1, target device 3a or 3b outputs a predetermined amount of the data to primary local bus 1a, such as DATA 107(1). When target device 3a or 3b finishes outputting the predetermined amount of the data, and when an IRDY signal is asserted again, target device 3a or 3b outputs another predetermined amount of the data.

Data path 8 includes a delayed read buffer in the same way as data path 6, and waits for target device 3a or 3b to output data to primary local bus 1a. When one unit of transfer data is output as shown as DATA 107(2), data path 8 stores the output data in the delayed read buffer, and waits for the master device to acquire the use of secondary local bus 1b. While data path 8 is waiting for the acquirement, data is continuously output from primary local bus 1a in transfer units. Data path 8 reads the output data, and stores the data in the delayed read buffer.

When the delayed read buffer is filled with data before the master device acquires the use of secondary local bus 1b, data path 8 stops reading and storing data. Data path 8 stops transferring data from primary local bus 1a.

When master device 2a succeeds in acquiring the use of secondary local bus 1b by a retry operation before the delayed read buffer is filled with data, data path 8 continues to read DATA 107 (this is the same operation as a Flow-Through Mode of 21152-type device manufactured by DIGITAL EQUIPMENT CORPORATION), while outputting the data that has been stored in the delayed read buffer to secondary local bus 1b as shown as DATA 107(3). The output data is transferred to master device 2a. Data path 8 transfers data into and outputs data from the delayed read buffer simultaneously, so that one burst data transfer with an arbitrary burst data transfer length independent of the capacity of the delayed read buffer may be performed.

Latency timer register 9 holds a period of time, for instance, 32 clock cycles, as the period of time for releasing a bus in accordance with the PCI bus standard.

Counter 10 loads the initial value from latency timer register 9 and starts the countdown from the loaded initial value when a device connected to secondary local bus 1b starts transferring data, and when the condition of the control line of secondary local bus 1b changes. By doing so, the time ellapsed from the start of the data transfer involving one of the master devices connected to secondary local bus 1b is counted. When the countdown from the initial value loaded from latency timer register 9 finishes, the period of time set in latency timer register 9 has elapsed. When the countdown finishes, and when no GNT signal is asserted, the use of secondary local bus 1b is idle to immediately stop the data transfer.

Threshold register 11 holds a period of time that is shorter than the period of time that latency timer register 9 holds.

Comparison unit 12 judges whether the following conditions are satisfied when PCI-PCI bridge device 4 acquires the use of primary local bus 1a, and starts to use primary local bus 1a. When a master device apart from the master device that performs image stream transfer occupies secondary local bus 1b, comparison unit 12 judges whether the numerical value that counter 10 counts is larger than the numerical value of the period of time held by latency timer register 9 but smaller than the period of time held by threshold register 11, and whether the master device that performs image stream transfer has output an REQ signal.

Arbitration unit 13 is a specialed circuit that performs the bus arbitration processing in accordance with the PCI bus standard, but is characterized by the processing described below. When master device 2a that performs image stream transfer has output an REQ signal, when comparison unit 12 has judged that the predetermined conditions described above are satisfied, and when PCI-PCI bridge device 4 operates as the target for secondary local bus 1b, arbitration unit 13 outputs a STOP signal (for instance, STOPs 109 or 111) via control unit 5 to another master device that has already acquired the use of secondary local bus 1b, to have the use given to the other master device lapse. As a result, secondary local bus 1b is idle. When another master device has output an REQ signal for acquiring the use of secondary local bus 1b before master device 2a, arbitration unit 13 outputs no GNT signal to the other master device, or stops the GNT signal that has been output to the other master device.

The above processing is performed so that the arbitration unit 13 and control unit 14 can allow master device 2a to perform one burst data transfer. Accordingly, arbitration unit 13 releases secondary local bus 1b from the occupation by the other master device quickly. In other words, instead of waiting the period of time for releasing a bus in accordance with the PCI bus standard, arbitration unit 13 in PCI-PCI bridge device 4, releases secondary local bus 1b from the occupation by the other master device after the shorter period of time that is held by threshold register 11 has elapsed. As a result, image stream that is large in size is read preferentially.

Control unit 14 waits for an address for the target device connected to primary local bus 1a to be output to primary local bus 1a. When the address of the target device is output to primary local bus 1a, control unit 14 asserts an IRDY signal to the target device which has been assigned the output address, and has the target device start data output. When the target device has output the predetermined amount of the requested data, control unit 14 asserts an IRDY signal to the target device, and has the target device start outputting the next predetermined amount of the data.

Delay control unit 15 asks comparison unit 12 whether the above predetermined conditions are satisfied when target access unit 7 acquires the use of primary local bus 1a. When these conditions are satisfied, delay control unit 15 inserts a "wait" into the IRDY signal asserted by control unit 14 to reduce the output rate of data from primary local bus 1a.

Such wait insertion into an IRDY signal delays the output of the data from the target device by the inserted wait. As a result, the period of time taken to fill the delayed read buffer in data path 8 with the output data is extended. The longer the period of time taken to fill the delayed read buffer will, the higher the probability that master device 2a succeeds in acquiring the use of secondary local bus 1b will. As a result, the probability that the master device 2a acquires the use of secondary local bus 1b before the delayed read buffer is filled with data increases.

Such wait insertion can be realized by delaying the output timing of the IRDY signal that is to be output between the transfer of the address of the target device and the transfer of read data, and by delaying the output timing of the IRDY signal that is to be output between a transfer of read data and the following transfer of read data.

When the predetermined conditions are satisfied, control unit 14 inserts a wait equivalent to seven clock cycles between the address output and the assertion of IRDY 112 by deasserting IRDY 112 for seven clock cycles (the maximum wait allowed by the PCI bus standard). Control unit 14 also inserts a wait equivalent to seven clock cycles between data transfer and the following data transfer by deasserting IRDY 112 for seven clock cycles (the maximum wait allowed by the PCI bus standard).

When a GNT signal is asserted, so that master device 2a acquires the use of secondary local bus 1b, comparison unit 12 judges that the predetermined conditions are no longer satisfied. No wait is inserted and data is continuously transferred. When the period of time taken to fill the delayed read buffer with data is extended by reducing the output rate of the IRDY signal, DATA 107 may be sequentially output to master device 2a without having to temporarily stop data transfer via secondary local bus 1b.

Figure 5:
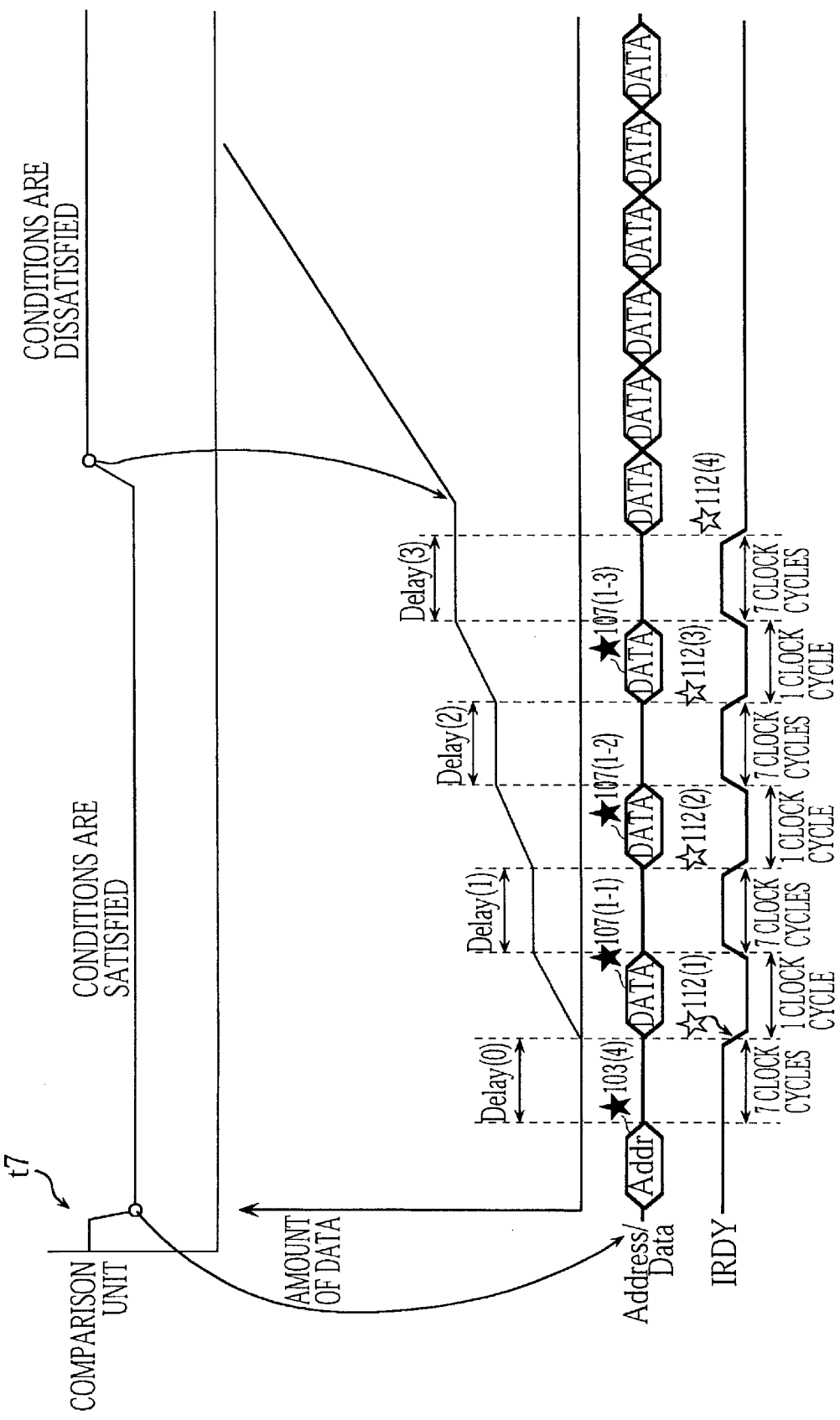
FIG. 5 is a timing chart for when the predetermined conditions are judged to be satisfied from the numerical value is counted by counter 10.

When the size of data transferred via primary local bus 1a or secondary local bus 1b in one transfer unit is one word, and when the capacity of the delayed read buffer in data path 8 is 12 words, the period of time taken to fill the delayed read buffer in data path 8 with data can be extended by up to 84 clock cycles (=1×7+(12−1)×7) by inserting waits into IRDY 112 shown in FIG. 5. As a result, the time limit for the acquirement of the use of secondary local bus 1b by master device 2a is drastically extended, and the probability that master device 2a will acquire the use of secondary local bus 1b in time is substantially increased.

The operation performed by the computer system the construction of which has been explained is described below.

Operation (1-1)
The Operation When the Use of Primary Local Bus 1a and Secondary Local Bus 1b is Acquired Quickly Strictly speaking, operation (1-1) is the same as the conventional delayed read. Since this, however, forms the basic operation of the computer system, operation (1-1) is explained below.

Figure 3:
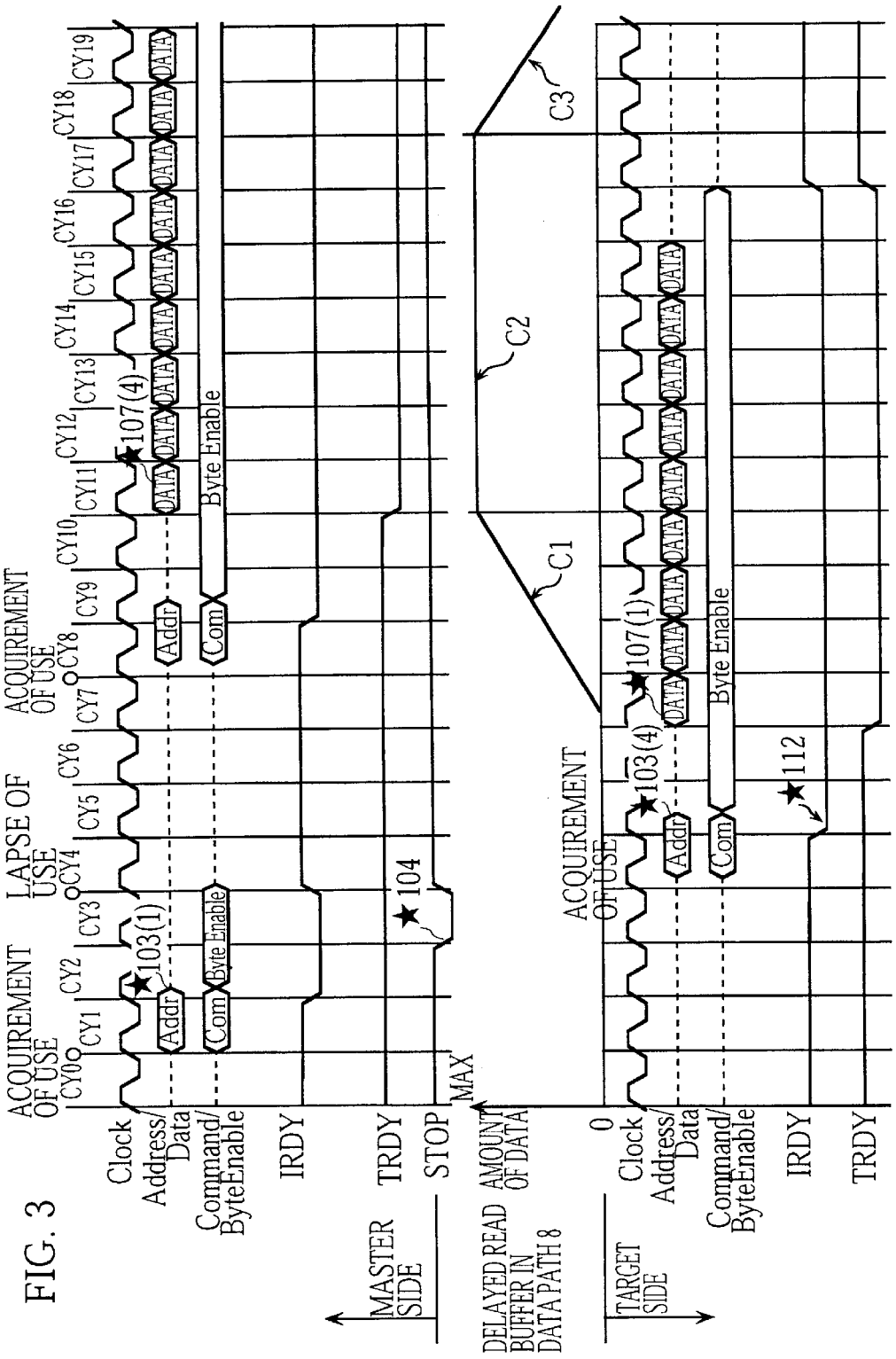
FIG. 3 is a drawing where the upper and lower parts is timing charts for the control signals on the master and target side, while the middle part is a graph that shows the change of the amount of data stored in the delayed read buffer in data path 8.

In FIG. 3, the chart in the upper part shows the timing of each of the control signals on the master side shown in FIG. 1, the chart in the lower part shows the timing of each of the control signals on the target side shown in FIG. 1, and the graph in the middle part shows the change of the amount of data stored in the delayed read buffer in data path 8. In FIG. 3, the same control signals as shown in FIGS. 1 and 2 are given asterisk marks and the same reference numbers as in FIGS. 1 and 2. The y-axis represents the time for all the charts and the graph in FIG. 3.

FIG. 3 shows that master device 2a acquires the use of secondary local bus 1b in cycle CY1, during which ADDRESS 103(1) is output.

In cycle CY3, control unit 5 asserts STOP 104 as shown as reference number 104. As a result, the use of secondary local bus 1b acquired by master device 2a lapses in cycle CY4.

On the target side, in cycle CY4 target access unit 7 acquires the use of primary local bus 1a, and ADDRESS 103(4) transferred via the delayed read buffer in data path 6 appears on primary local bus 1a. When control unit 14 asserts IRDY 112 in cycle CY5, target device 3a outputs data as shown as DATA 107(1). DATA 107(1) that has been output from target device 3a appears on primary local bus 1a in cycles CY7, CY8, CY9, and CY10.

On appearing on primary local bus 1a, DATA 107(1) starts being input into the delayed read buffer in data path 6. As a result, the amount of data stored in the delayed read buffer in data path 8 starts increasing in cycle CY7.

Master device 2a repeats a retry operation cycles CY4 to CY8, and finally acquires the use of secondary local bus 1b in cycle CY8. When master device 2a acquires the use of secondary local bus 1b in cycle CY8, data is output from the delayed read buffer in data path 8 to secondary local bus 1b in cycle CY11. When the input rate and the output rate of data for the delayed read buffer are the same, the amount of data in the delayed read buffer in data path 8 is unchanged in cycles CY11 to CY18 as shown as C2 in the graph. In other words, the same amount of data is input into and output from the delayed read buffer in data path 8.

After the data input into the delayed read buffer in data path 8 is completed in cycle CY16, data is merely output from the delayed read buffer in data path 8. As a result, the amount of data stored in the delayed read buffer in data path 8 decreases as shown as C3 in the graph.

Operation (1-2)
The Operation When the Use of Primary Local Bus 1a is Acquired but the Use of Secondary Local Bus 1b is not Acquired Quickly by a Retry Operation In operation (1-2), the address of target device 3a has been output to primary local bus 1a, the use of primary local bus 1a has been acquired, and the use of secondary local bus 1b has not been acquired because secondary local bus 1b is occupied by a master device apart from master device 2a.

Figure 4:
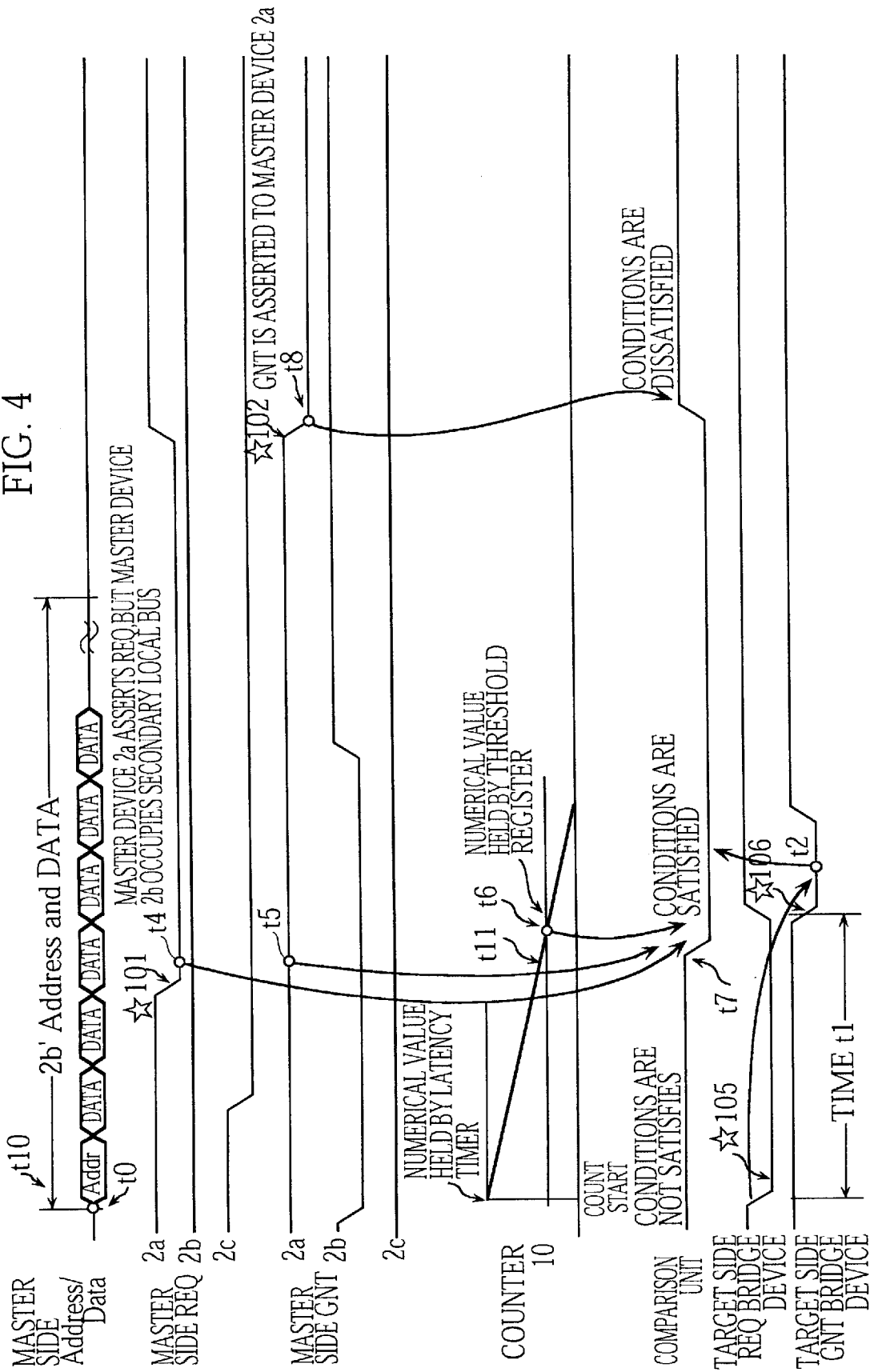
FIG. 4 is a timing chart for when master device 2b occupies secondary local bus 1b following the acquisition by target access unit 7 of the use of secondary local bus 1b.

FIG. 4 is a timing chart for when master device 2b occupies secondary local bus 1b following the acquisition by target access unit 7 of the use of secondary local bus 1b. Operation (1-2) is explained below with reference to FIG. 4.

After outputting REQ 105, target access unit 7 receives the assertion of GNT 106 at time t2, and acquires the use of primary local bus 1a. While the acquirement of the use of primary local bus 1a is simply described and the use seems to be acquired instantly in operation (1-1), latency, for instance, time t1 is included in the process of the acquirement. When target access unit 7 acquires the use of primary local bus 1a at time t2, delay control unit 15 asks comparison unit 12 whether the predetermined conditions are satisfied.

Meanwhile, the address and data output from master device 2b is transferred via secondary local bus 1b at time t10, that is, secondary local bus 1b is occupied by a device apart from master device 2a. The address and data starts being transferred from master device 2b at time t10, when counter 10 starts the countdown of the numerical value loaded from latency timer register 9. The numerical value counted by counter 109 decrease as shown as line t11, and eventually becomes equal to or smaller than the numerical value held by threshold register 11.

At time t4, REQ 101 from master device 2a is asserted. As a result, the predetermined conditions are satisfied, and comparison unit 12 judges that the predetermined conditions are satisfied.

The process in which data is transferred via primary local bus 1a after the satisfaction of the predetermined conditions at time t7 is described below with reference to FIG. 5.

FIG. 5 shows the timing of data transfer when the predetermined conditions are judged as the numerical value loaded from latency timer register 9 is counted by counter 10. When the predetermined conditions are judged to be satisfied at time t7, data path 6 transfers the address of target device 3a to primary local bus 1a, and control unit 14 deasserts IRDY 112 for seven clock cycles under the control of delayed read control unit 15. As a result, the amount of data stored in the delayed read buffer in data path 8 is unchanged as shown as Delay (0) in the graph in FIG. 5. When IRDY 112 is asserted as shown as reference number 112 (1), only the first part of data 107(1) (shown as data 107(1-1) in FIG. 5) is output to primary local bus 1a.

When data 107(1-1) is output, control unit 14 deasserts IRDY 112 for the following seven clock cycles under the control of delay control unit 15.

As a result, the amount of data stored in the delayed read buffer in data path 8 is unchanged as shown as Delay (1) in the graph in FIG. 5. When IRDY 112 is asserted as shown as reference number 112(2), the second part of data 107(1) (shown as data 107(1-2) in FIG. 5) is output to primary local bus 1a.

Before the following data is output, control unit 14 deasserts IRDY 112 for seven clock cycles, so that the amount of data stored in the delayed read buffer in data path 8 is unchanged as shown as Delay (2) in the graph in FIG. 5. After that, Delay (3) appears in the graph in the same process as Delay (2). Unlike the graph shown in FIG. 3 in which the amount of data stored in the delayed read buffer in data path 8 steadily increases, the amount of data stored in delayed read buffer in data path 8 is kept constant 4 times, as shown as Delays (0) to (3) in FIG. 5. In this way, the time taken to fill the delayed read buffer in data path 8 with data is extended.

When GNT 106 is assorted to master device 2a at time t8 in FIG. 4, and when secondary local bus 1b is idle, comparison unit 12 judges that the predetermined conditions are dissatisfied, and control unit 14 stops deasserting IRDY 112. As a result, DATA 107 is sequentially input into the delayed read buffer in data path 8, and the input rate of data into the delayed read buffer in data path 8 is returned to the original rate.

With the present embodiment, when the capacity of a delayed read buffer is small, there is still a high probability that read operations via the bridge device will be performed using burst data transfers with long burst data transfer length.

The Second Embodiment

Figure 6:
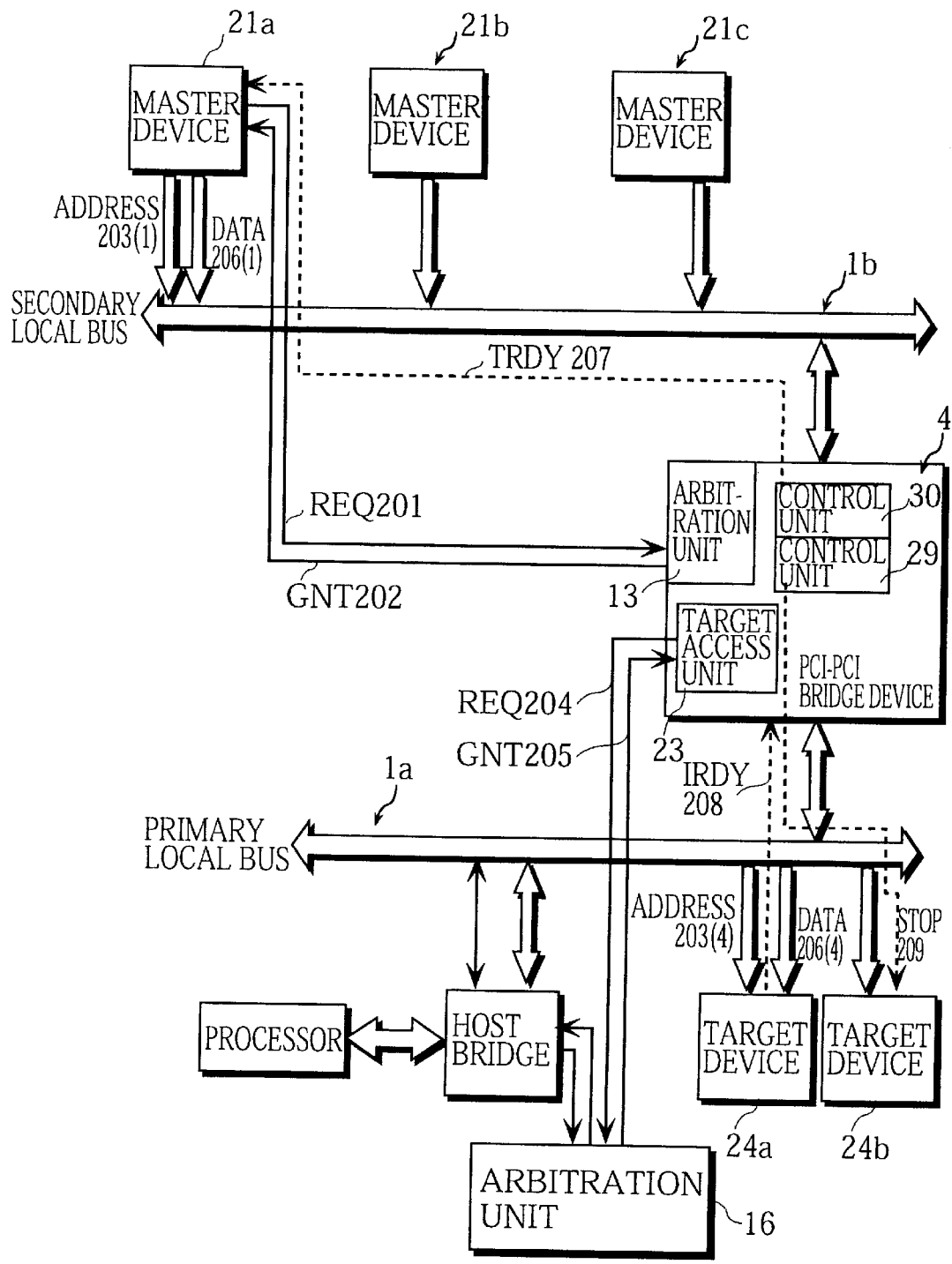
FIG. 6 shows an overall construction of a computer system according to the second embodiment of the present invention.
Figure 7:
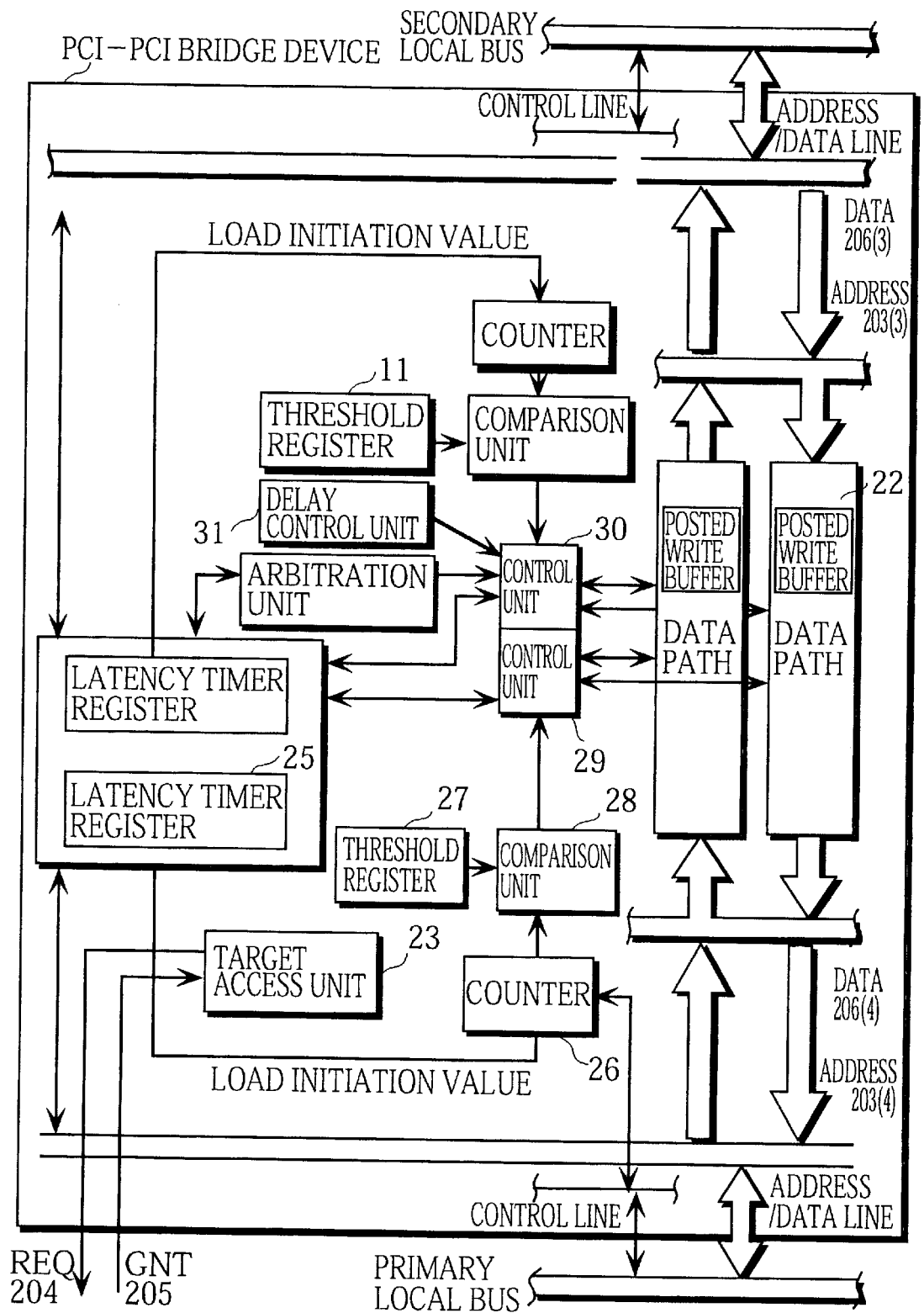
FIG. 7 shows a construction of PCI-PCI bridge device 4 in the computer system according to the second embodiment of the present invention.

FIG. 6 shows a construction of the computer system according to the second embodiment of the present invention in which PCI-PCI bridge device 4 connects two PCI buses. FIG. 7 shows an internal construction of PCI-PCI bridge device 4. FIG. 6 is referred when the overall structure of the computer system according to the second embodiment is described. FIG. 7 is referred when the internal structure of PCI-PCI bridge device 4 in the computer system is described. In these figures, the components that have the same operations as those in the first embodiment are given the same reference numbers in order to simplify the explanation. The components that have the different operations are given the reference numbers in the 20s and 30s to distinguish them from components in the first embodiment. Control signals are given the reference numbers in the 200s to distinguish them from the components. The same control signal that appears in different parts in these figures, for instances, ADDRESS 203 or DATA 206, is given sub-reference numbers (1), to (4) according to the order in which they appear.

FIG. 6 shows that the computer system includes primary local bus 1a, secondary local bus 1b, master devices 21a, 21b, and 21c, target devices 24a and 24b, and PCI PCI bridge device 4. FIG. 6 also shows that PCI-PCI bridge device 4 includes target access unit 23, and control units 29 and 30.

FIG. 7 shows that PCI-PCI bridge device 4 includes data path 22, target access unit 23, latency timer register 25, counter 26, threshold register 27, comparison unit 28, control units 29 and 30, and delay control unit 31.

Master device 21a, 21b, or 21c waits for the user to designate the data to be written in the target device and the target device in which the data is to be written and to give a write instruction. On the user inputs the designation and the instruction, master devices 21a, 21b, or 21c transfers an REQ signal to acquire the use of secondary local bus 1b (for instance, REQ 201 in FIG. 6) to arbitration unit 13. After transferring the REQ signal, master device 21a, 21b, or 21c waits for an enabling signal from arbitration unit 13 (for instance, GNT 202 in FIG. 6). On receiving the enabling signal and acquiring the use of secondary local bus 1b, master device 21a, 21b, or 21c outputs the address of the target device in which the data should be written to secondary local bus 1b as shown as ADDRESS 203(1). Master device 21a, 21b, or 21c outputs a write command to PCI-PCI bridge device 4 via a control line that is not shown in FIG. 6, and waits for a TRDY signal to be asserted as shown as TRDY 207. When the TRDY signal is asserted, master device 21a, 21b, or 21c outputs the data to be written to secondary local bus 1b as shown as DATA 206(1), and outputs a write command to PCI-PCI bridge device 4 via the control line that is not shown in FIG. 6.

In this example, master device 21a, out of master devices 21a to 21c, is set as the master of image stream transfer among. Here posted writes which involve the master of image stream transfer are given priority over posted writes in which other devices are involved.

Data path 22 shown only in FIG. 7 includes a posted write buffer for temporarily storing data. When one of master devices 21a to 21c outputs the address of the target device to secondary local bus 1b, data path 22 stores the address in the posted write buffer, and waits for PCI-PCI bridge device 4 to acquire the use of primary local bus 1a. When PCI-PCI bridge device 4 acquires the use of primary local bus 1a, data path 22 outputs the address stored in the posted write buffer to primary local bus 1a. When one of master devices 21a to 21c outputs data to secondary local bus 1b while data path 22 is waiting for PCI-PCI bridge device 4 to acquire the use of primary local bus 1a, data path 22 stores the output data in the posted write buffer.

When PCI-PCI bridge device 4 acquires the use of primary local bus 1a, data path 22 outputs the address stored in the posted write buffer to target device 24a, and waits for target device 24a to assert TRDY 208. When target device 24a asserts TRDY 208, data path 22 outputs the data stored in the posted write buffer to primary local bus 1a.

Data path 22 inputs data into and outputs data from the posted write buffer simultaneously, so that one burst data transfer with an arbitrary burst data transfer length independent of the capacity of the posted write buffer may be performed. When the posted write buffer is filled with data before the acquirement of the use or the release of primary local bus 1a, PCI-PCI bridge device 4 finishes transferring data from secondary local bus 1b, and completes the data transfer via secondary local bus 1b. PCI-PCI bridge device 4 waits for the release of primary local bus 1a. When primary local bus 1a is idle, PCI-PCI bridge device 4 outputs the address to primary local bus 1a. Then, after target device 24a asserts a TRDY signal, PCI-PCI bridge device 4 outputs the data to primary local bus 1a.

When data path 22 starts the process for storing an address in the posted write buffer, target access unit 23 tries to acquire the use of primary local bus 1a to which the address should be transferred via primary local bus 1a. In other words, target access unit 23 outputs an REQ signal to arbitration unit 16, which is the arbitrator for primary local bus 1a. Once arbitration unit 16 outputs a GNT signal after accepting the REQ signal, when target access unit 23 has succeeded in acquiring the use of primary local bus 1a, and when primary local bus 1a is idle, target access unit 23 has data path 22 output the address and a write command to primary local bus 1a. Now that the address and the command is output, the data stored in the posted write buffer should be output next. When the address and the write command is output, when the stored data is not output, and when a STOP signal is output because the target device does not prepare to accept the data, the use of primary local bus 1a acquired by PCI-PCI bridge device 4 lapses. When the use of primary local bus 1a lapses, target access unit 23 performs a retry operation, that is, outputs an REQ signal and reacquires the use of primary local device 1a.

Target device 24a or 24b reads a predetermined amount of the data from primary local data 1a, such as DATA 206(4) when the address of target device 24a or 24b is output to primary local bus 1a, and when a write command is output using a control line that is not shown in FIG. 6. When the predetermined amount of the data is read, and when another TRDY signal is asserted, the following predetermined amount of the data is read.

Latency timer register 25 holds a period of time for releasing a bus that the PCI bus standard prescribes.

Counter 26 loads initial value from latency timer register 25 and starts the countdown from the loaded initial value when a device connected to primary local bus 1a starts transferring data, and when the condition of the control line of primary local bus 1a changes. By doing so, the time elapsed from the start of the data transfer involving one of the master devices connected to secondary local bus 1b is counted. When the countdown from the initial value loaded from latency timer register 25 finishes, the period of time set in latency timer register 25 has elapsed. When the countdown finishes, and when no GNT signal is asserted, the use of primary local bus 1a is idle to immediately stop the data transfer.

Threshold register 27 holds a period of time that is shorter than the period of time that latency timer register 25 holds.

Comparison unit 28 judges whether the following conditions are satisfied when PCI-PCI bridge device 4 acquires the use of primary local bus 1a, and starts to use primary local bus 1a. When a target device apart from the target device that performs image stream transfer occupies primary local bus 1a, comparison unit 28 judges whether the numerical value that counter 26 counts is larger than the numerical value of the period of time held by latency timer register 25 but smaller than the period of time held by threshold register 27, and whether target access unit 23 outputs an REQ signal.

Control unit 30 waits that the address of the target device to which the data is to be written is output to a target device connected to primary local bus 1a via primary local bus 1a. When the address is output to primary local bus 1a, control unit 30 asserts a TRDY signal to the master device from which the data is to be output, and has the master device starts data output.

Delay control unit 31 judges whether arbitration unit 16 outputs a GNT signal when master device 21a acquires the use of secondary local bus 1b, and when target access unit 23 outputs an REQ signal. When judging that no GNT signal is output from arbitration unit 16, delay control unit 31 asks comparison unit 28 whether the predetermined conditions are satisfied. When the predetermined conditions are satisfied, delay control unit 31 inserts waits into the TRDY signal asserted by control unit 30.

Such wait insertion into a TRDY signal delays the output of the data from the master device by the inserted wait. As a result, the period of time taken to fill the posted write buffer in data path 22 with the output data is extended. The longer the period of time taken to fill the posted write buffer will, the higher the probability that target access unit 23 succeeds in acquiring the use of primary local bus 1a will.

Such wait insertion can be realized by delaying the output timing of the TRDY signal that is to be output between data transfer from the master device and the following data transfer.

When the predetermined conditions are satisfied, delay control unit 31 inserts a wait equivalent to 15 clock cycles between the address output and the assertion of TRDY 207 by deasserting TRDY 207 for 15 clock cycles (the maximum wait allowed by the PCI bus standard). Delay control unit 31 inserts a wait equivalent to seven clock cycles between data transfer and the following data transfer by deasserting TRDY 207 for seven clock cycles (the maximum wait allowed by the PCI bus standard).

When target access unit 23 acquires the use of primary local bus 1a, and when primary local bus 1a is idle, comparison unit 12 judges that the predetermined conditions are no longer satisfied. As a result, no wait is inserted, and data transfer from the master device is continued. When target device 24a starts using primary local bus 1a before the posted write buffer is filled with data, DATA 206 is sequentially output to target device 24a without having to temporarily stop data transfer via secondary local bus 1b.

Figure 10:
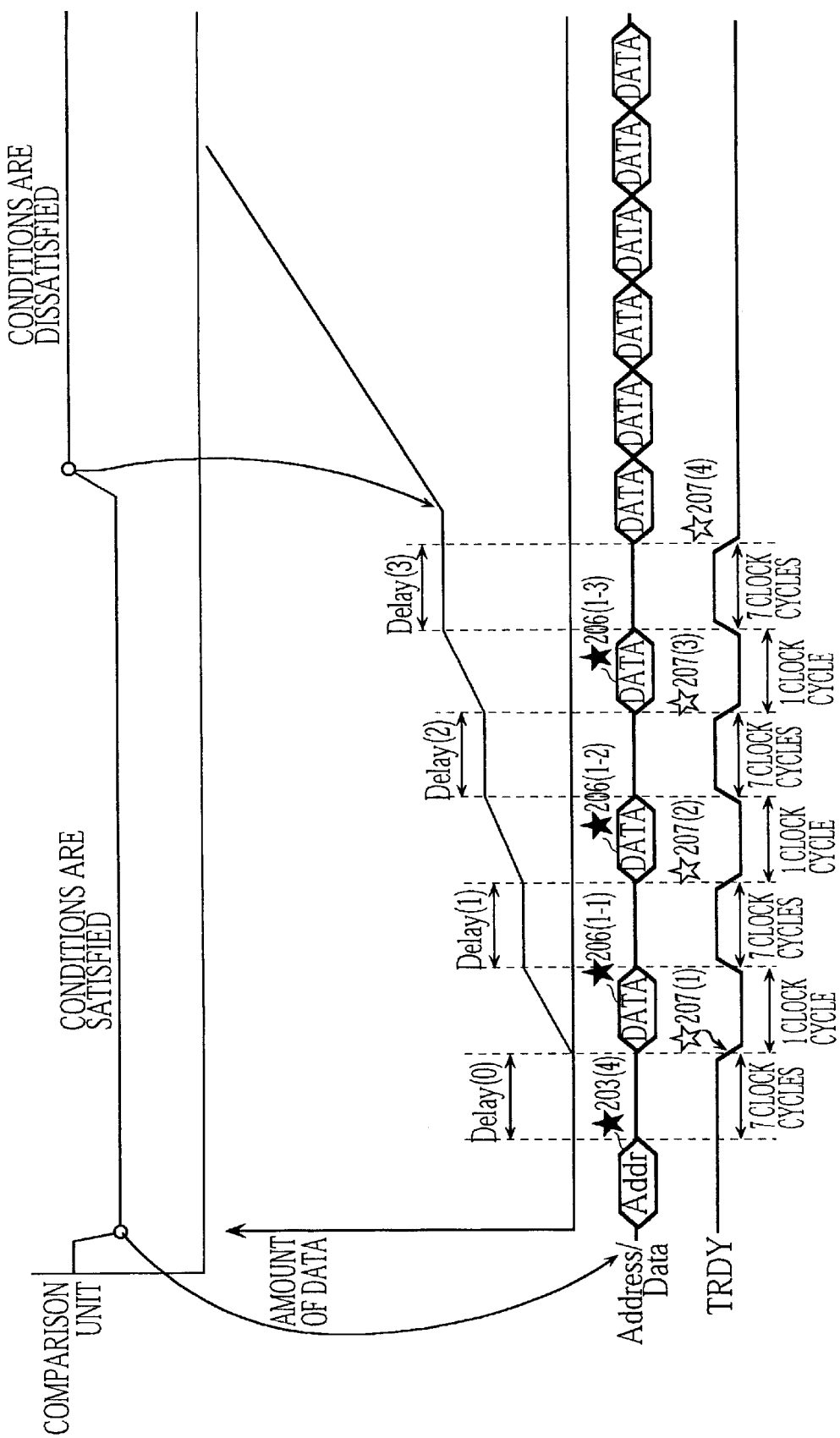
FIG. 10 is a timing chart for when the predetermined conditions are judged to be satisfied from the numerical value is counted by counter 26.

When the size of data transferred via primary local bus 1a or secondary local bus 1b in one transfer unit is one word, and when the capacity of the posted write buffer in data path 22 is 12 words, the period of time taken to fill the posted write buffer in data path 22 with data can be extended by up to 92 clock cycles (=1×15+(12−1)×7) by inserting waits into TRDY 207 shown in FIG. 10. As a result, the time limit for the acquirement of the use of secondary local bus 1b by master device 21a is drastically extended, and the probability that master device 21a will acquire the use of secondary local bus 1b in time is substantially increased.

The operation performed by the computer system the construction of which has been explained is described below.

Operation (2-1)

The Operation When the Use of Primary Local Bus 1a and Secondary Local Bus 1b is Acquired Quickly Strictly speaking, operation (2-1) is the same as the convention posted write. Since this, however, forms the basic operation of the computer system, operation (2-1) is explained below.

Figure 8:
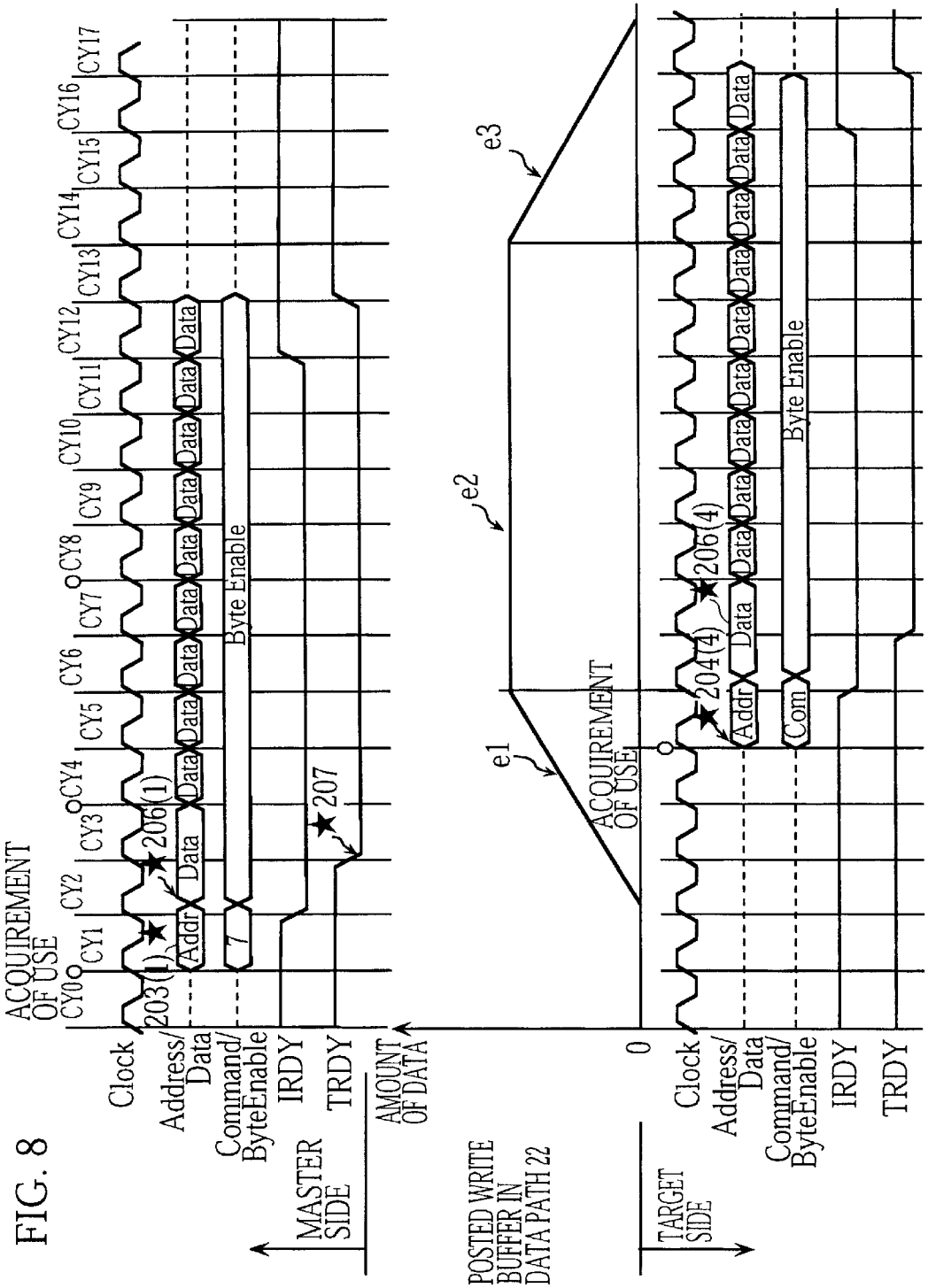
FIG. 8 is a drawing where the upper and lower parts is timing charts for the control signals on the master and target side, while the middle part is a graph that shows the change of the amount of data stored in the posted write buffer in data path 22.

In FIG. 8, the chart in the upper part shows the timing of each of the control signals on the master side shown in FIG. 6, the chart in the lower part shows the timing of each of the control signals on the target side shown in FIG. 6, and the graph in the middle part shows the change of the amount of data stored in the posted write buffer in data path 22. In FIG.

8, the same control signals as shown in FIGS. 6 and 7 are given asterisk marks and the same reference numbers as in FIGS. 6 and 7. The y-axis represents the time for all the charts and the graph in FIG. 8.

FIG. 8 shows that master device 21a acquires the use of secondary local bus 1b in cycle CY1, during which ADDRESS 203(1) is output.

In cycle CY2 master device 21a outputs DATA 206(1) as shown as reference number 206. When control unit 30 asserts TRDY signal 207 in cycle CY3, data is sequentially input into the posted write buffer in data path 22.

When data starts being input into the posted write buffer in data path 22 in cycle CY2, the amount of data stored in the posted write buffer in data path 22 starts increasing in cycle CY2 as shown as c1.

Target access unit 23 repeats a retry operation in cycles CY2 to CY5, and finally acquires the use of primary local bus 1a in cycle CY5. Data starts being output from the posted write buffer in data path 22 to primary local bus 1a in cycle CY5. When the input rate and the output rate of data for the posted write buffer are the same, the amount of data in the posted write buffer in data path 22 is unchanged in cycles CY6 to CY13 as shown as e2 in the graph. In other words, the same amount of data is input into and output from the posted write buffer in data path 22.

After the data output from secondary local bus 1b is completed in cycle CY13, data is merely output from the posted write buffer in data path 22. As a result, the amount of data stored in the posted write buffer in data path 22 drastically decreases in cycles CY14 to CY17 as shown as e3 in the graph.

Operation (2-2)
The Operation When the Use of Secondary Local Bus 1b is Acquired but the Use of Primary Local Bus 1a is not Acquired Quickly by a Retry Operation In operation (2-2), the use of secondary local bus 1b has been acquired, and the use of primary local bus 1a has not been acquired because primary local bus 1a is occupied by a target device apart from target device 24a.

Figure 9:
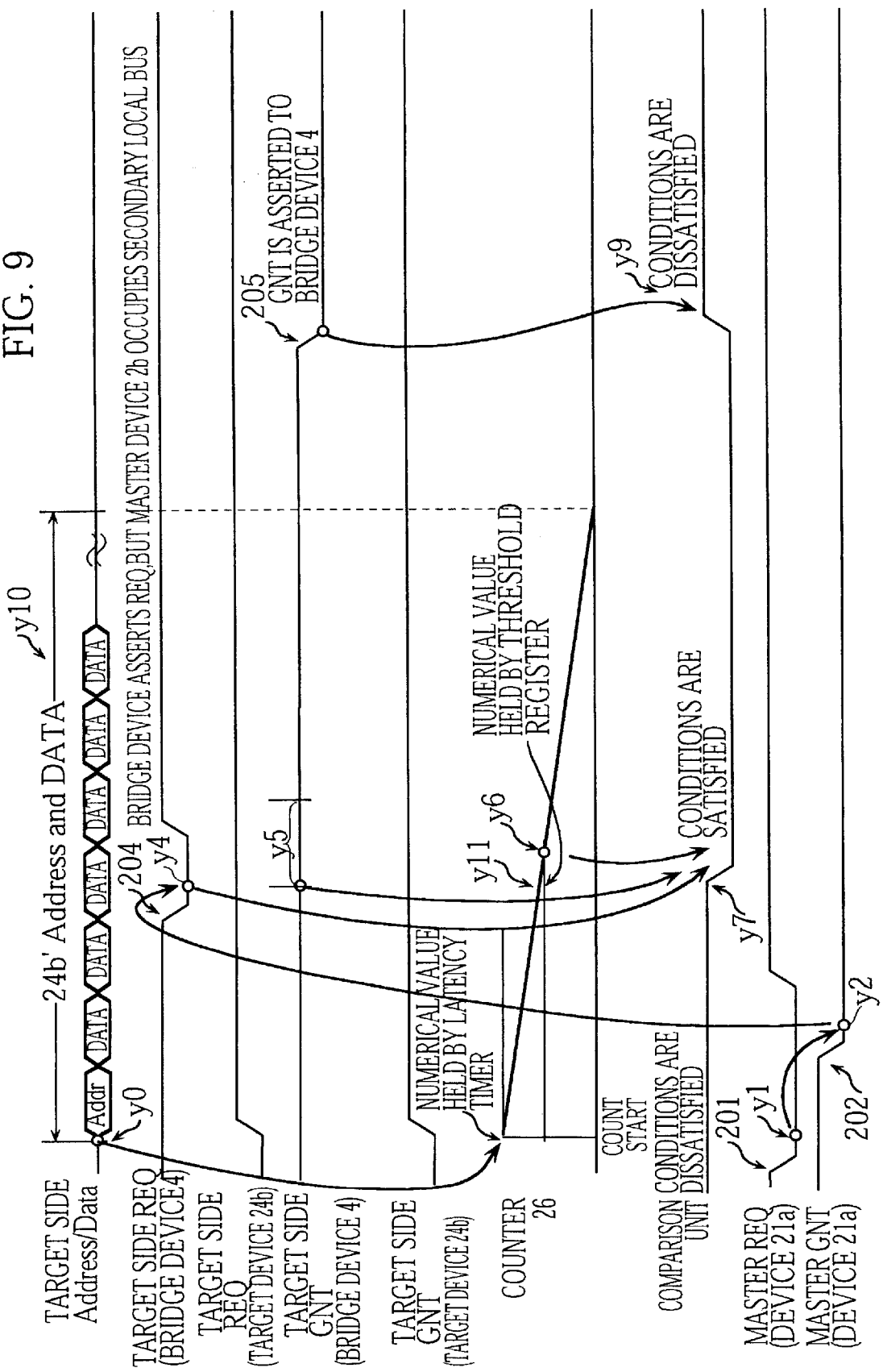
FIG. 9 is a timing chart for when target device 24b occupies first local bus 1a following the acquisition by master devices 21a and 21b of the use of secondary local bus 1b.

FIG. 9 is a timing chart for when target device 24b occupies first local bus 1a following the acquisition by master devices 21a and 21b of the use of secondary local bus 1b. Operation (2-2) is explained below with reference to FIG. 9.

After outputting REQ 201 at time y1, target access unit 23 receives the assertion of GNT 202 at time y2, and acquires the use of secondary local bus 1b. Target access unit 23 outputs REQ 204 at time y4. When arbitration unit 16 outputs GNT 205 just after the output of REQ 204 from target access unit 23, the same operation as in FIG. 8 is performed. When no GNT 205 is output from arbitration unit 16 after time y5 has elapsed since target access unit 23 output REQ 204, delay control unit 31 asks comparison unit 28 whether the predetermined conditions are satisfied.

Meanwhile, the address of target device 24b and data is transferred via primary local bus 1a, that is, primary local bus 1d is occupied by a target bus apart from target device 24a. The address and the data starts being transferred to target device 24b at time y10, when counter 26 starts the countdown of the numerical value loaded from latency timer register 25. The numerical value counted by counter 26 decreases as shown as line y11, and eventually becomes equal to or smaller than the numerical value held by threshold register 27.

At time y4, REQ 201 from master device 21a is asserted. As a result, the predetermined conditions are satisfied, and comparison unit 28 judges that the predetermined conditions are satisfied at time y7.

The process in which data is transferred via secondary local bus 1b after the satisfaction of the predetermined conditions at time y7 is described below with reference to FIG. 10.

FIG. 10 shows the timing of data transfer when the predetermined conditions are judged as the numerical value loaded from latency timer register 25 is counted by counter 26. When the predetermined conditions are judged to be satisfied at time y7, data path 22 transfers the address of the target device to primary local bus 1a, and control unit 30 deasserts TRDY 207 for the following 15 clock cycles under the control of delayed read control unit 31. As a result, the amount of data stored in the posted write buffer in data path 22 is unchanged as shown as Delay (0) in the graph in FIG. 10. When IRDY 207 is asserted, only the first part of data 206(1) (shown as data 206(1-1) in FIG. 10) is output to primary local bus 1a.

When data 206(1-1) is output, control unit 30 deasserts TRDY 112 for the following seven clock cycles under the control of delay control unit 31.

As a result, the amount of data stored in the posted write buffer in data path 22 is unchanged as shown as Delay (1) in the graph in FIG. 10. When TRDY 207 is asserted as shown as reference number 207(2), the second part of data 206(1) (shown as data 206(1-2) in FIG. 10) is output to primary local bus 1a.

Before the following data is output, control unit 30 deasserts TRDY 207 for seven clock cycles, the amount of data stored in the posted wire buffer in data path 22 is unchanged as shown as Delay (2) in the graph in FIG. 10. After that, Delay (3) appears in the graph in the same process as Delay (2). Unlike the graph shown in FIG. 8 in which the amount of data stored in the posted write buffer in data path 22 steadily increases, the amount of data stored in delayed read buffer in data path 22 is kept constant 4 times, as shown as Delays (0) to (3) in FIG. 10. In this way, the time taken to till the posted write buffer in data path 22 with data is extended.

When GNT 202 is asserted to master device 21a at time y9 in FIG. 9, comparison unit 28 judges that the predetermined conditions are dissatisfied, and control unit 30 stops deasserting TRDY 207. As a result, DATA 206 is sequentially input into the posted write buffer in data path 22, and the input rate of data into the posted write buffer in data path 22 is returned to the original rate.

With the present embodiment, when the capacity of a posted write buffer is small, there is still a high probability that write operation via the bridge device will be performed using burst data transfers with long burst data transfer length.

The master device connected to the secondary local bus reads data from the target device connected to the primary local bus in the first embodiment. When the arbitration "PCI bus" is installed outside of the bridge device, or when the master device connected to the primary local bus reads data from the target device connected to the secondary local bus, it is possible for the bridge device to perform the operation described in the first embodiment by adding a dedicated signal line called a "sideband signal" by the PCI bus standard to the computer system.

(Hardware Configuration)

Figure 11:
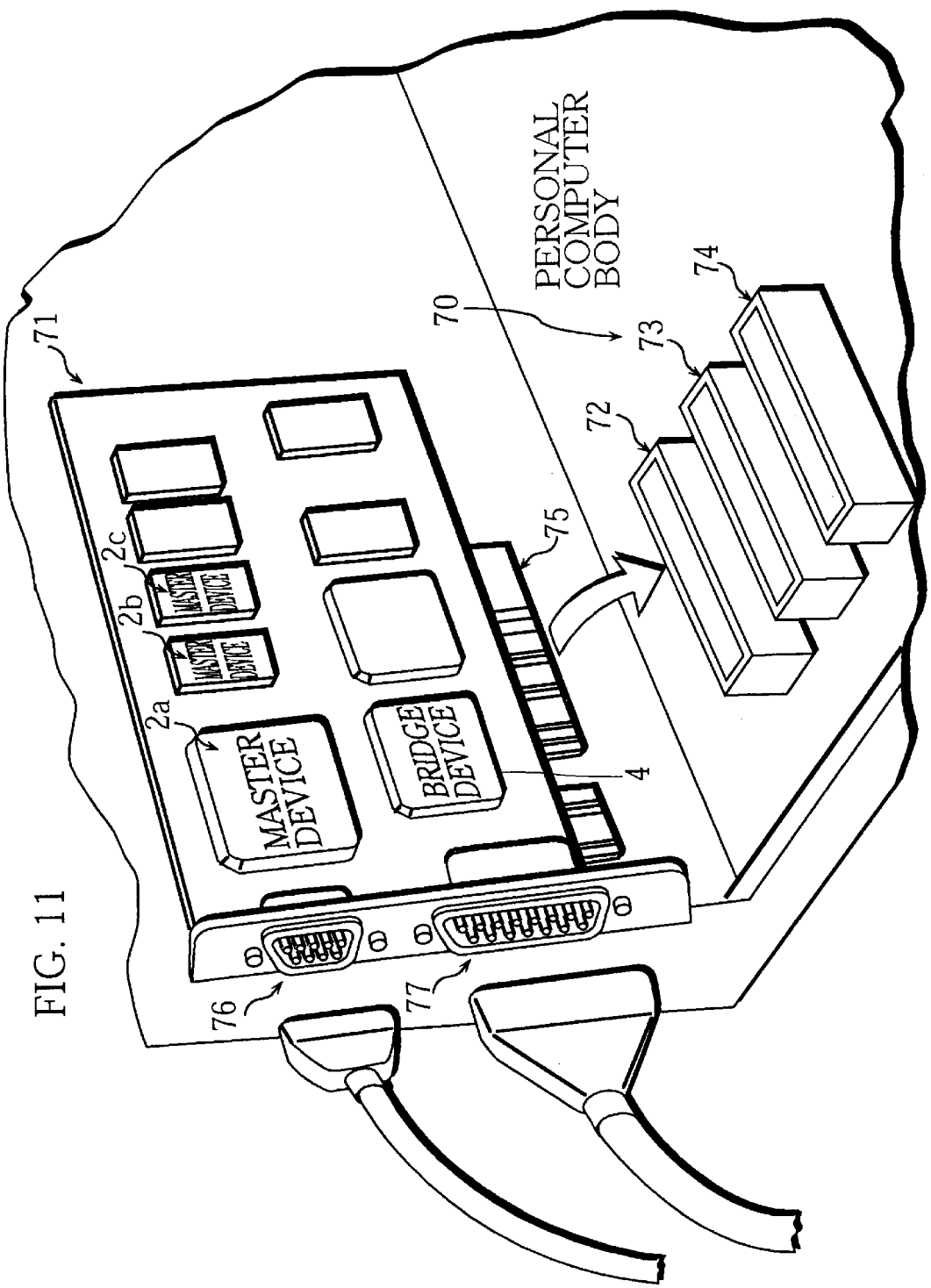
FIG. 11 shows a computer system in which master devices 2a, 2b, and 2c, and secondary local bus 1b are installed on PCI expansion card 71.

The installment of master devices 2a to 2c, primary local bus 1a, secondary local bus 1b, and target devices 3a and 3b in a hardware is described below. FIG. 11 shows a computer system in which master devices 2a, to 2c, and secondary local bus 1b are installed on PCI expansion card 71. On the personal computer body, primary local bus 1a, and target devices 3a and 3b are installed. Shared slots 72 to 74 are also installed on the personal computer body for connecting PCI expansion card 71 to the personal computer body. When connector 75 on PCI expansion card 71 is inserted into shared slot 72, PCI—PCI bridge device 4 is physically connected to primary local bus 1a.

When master device 2a is a LAN (Local Area Network) interface and master device 2b is an HDD (Hard Disk Drive) interface, a processor on the personal computer body may use the local area network and the external drive connected by connectors 75 and 76.

Master devices 2a to 2c, and secondary local bus 1b can be included in an LSI (Large Scale Integrated Circuit). The computer system shown in FIG. 1 can be installed not only on a personal computer body, but also on a mother board.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A bridge device that is installed in a computer system that includes: a sender bus that performs data transfer at a maximum transfer rate equal to a first transfer rate and is connected to a sender device that outputs data; a receiver bus that performs data transfer at a maximum transfer rate equal to the first transfer rate and is connected to a receiver device that receives the data; and arbitration means that performs arbitration between devices when assigning uses of the sender bus and the receiver bus, the bridge device comprising:
    request signal output means for outputting, when the sender device acquires the use of the sender bus, a request signal for requesting the use of the receiver bus to the arbitration means;
    transfer rate reduction means for reducing, when the bridge device has to wait to acquire the use of the receiver bus as a result of arbitration by the arbitration means, a transfer rate on the sender bus from the first transfer rate to a second transfer rate that is lower than the first transfer rate;
    a buffer for reading and storing data that is transferred via the sender bus;
    transfer rate return means for having the transfer rate on the sender bus return to the first transfer rate when the bridge device acquires the use of the receiver bus; and
    output means for outputting data stored in the buffer to the receiver bus according to a FIFO (First-In First-Out) order.

2. The bridge device according to claim 1, wherein
the transfer rate reduction means reduces the transfer rate on the sender bus to the second transfer rate by inserting wait cycles into a data output process of the sender device, and
the transfer rate return means has the transfer rate on the sender bus return to the first transfer rate by no longer inserting wait cycles into the data output process of the sender device.

3. The bridge device according to claim 2, wherein
the bridge device is connected to the sender device on the sender bus by a control line, the control line showing one of a transferrable condition where the bridge device is able to receive data output from the sender device and a non-transferrable condition where the bridge device is unable to receive data output from the sender device, the transfer rate reduction means includes a delay control unit for inserting, when the bridge device waits to acquire the use of the receiver bus as a result of arbitration by the arbitration means, wait cycles into the data output process of the sender device by switching a condition of the control line into the non-transferrable condition and switching the condition of the control line from the non-transferrable condition into the transferrable condition after waiting for a first predetermined period of time, and the transfer rate return means includes a first switch unit for switching the condition of the control line to the transferrable condition when the bridge device acquires the use of the receiver bus.

4. The bridge device according to claim 3, wherein the delay control unit includes a second switch unit for waiting, when the bridge device waits to acquire the use of the receiver bus as a result of the arbitration by the arbitration means, for an address of the receiver device to be output on the sender bus, and for switching, when the address of the receiver device is output on the sender bus, the condition of the control line into the non transferrable condition, and for switching the condition of the control line from the non-transferrable condition into the transferrable condition after waiting for a second predetermined period of time.

5. The bridge device according to claim 4, wherein the delay control unit includes a third switch unit for switching, when the bridge device waits to acquire the use of the receiver bus as a result of the arbitration by the arbitration means, the condition of the control line into the non-transferrable condition whenever data is input into the buffer, and for switching the condition of the control line from the non-transferrable condition to the transferrable condition after waiting for the third predetermined period of time.

6. The bridge device according to claim 5, wherein
the sender device includes a storage resource that stores data, and reads data stored in the storage resource and outputs the data to the sender bus when a read command is output, and the receiver device outputs a read command, and when data that the read command requests is output to the receiver bus, receives the output data, the bridge device further comprising:
    reception means for receiving a read command from the receiver device, the read command identifying the sender device as the data source; and
    output instructing means for receiving a read command and instructing the sender device to read the data stored in the storage resource and to output the read data to the receiver bus, wherein the request signal output means outputs, when the sender device acquires the use of the sender bus, a request signal for requesting the use of the receiver bus to the arbitration means, and the transfer rate reduction means reduces, when the bridge device has to wait to acquire the use of the receiver bus as a result of arbitration by the arbitration means, a transfer rate on the sender bus from the first transfer rate to a second transfer rate that is lower than the first transfer rate.

7. The bridge device according to claim 6, wherein
the sender bus and the receiver bus are PCI (Peripheral Component Interconnect) buses,
the control line is an IRDY (Initiator Ready) signal line,
the second predetermined time and the third predetermined time are seven clock cycles, and the second switch unit and the third switch unit switch the condition of the control line to the transferrable condition by asserting the IRDY signal.

8. The bridge device according to claim 5, wherein
the receiver device includes a storage resource in which data is to be written according to a write command, and when a write command in which the receiver device is indicated as a data destination is output, receives data transferred to the receiver bus and writes the transferred data in the storage resource, and the sender device outputs a write command and data that is to be written in the receiver to the sender bus according to the write command simultaneously, the bridge device further comprising:
reception means for receiving a write command from the sender device, the write command indicating the receiver device as the data destination; and output instructing means for receiving a write command and instructing the sender device to read data to be written and to output the read data to the sender bus, wherein the request signal output means outputs, when the sender device acquires the use of the sender bus, a request signal for requesting the use of the receiver bus to the arbitration means, and the transfer rate reduction means reduces, when the bridge device has to wait to acquire the use of the receiver bus as a result of arbitration by the arbitration means, a transfer rate on the sender bus from the first transfer rate to a second transfer rate that is lower than the first transfer rate.

9. The bridge device according to claim 8, wherein
the sender bus and the receiver bus are PCI buses,
the control line is a TRDY (Target Ready) signal line,
the second predetermined time is 15 clock cycles, the third predetermined time is seven clock cycles, and the second switch unit and the third switch unit switch the condition of the control line to the transferrable condition by asserting the TRDY signal.

10. The bridge device according to claim 2 further comprising:
a timer for counting, when the receiver bus is occupied by a device apart from the receiver device, a time elapsed after the device apart from the receiver device acquires the use of the receiver bus; and stop signal output means for outputting, when the bridge device waits to acquire the use of the receiver bus as a result of the arbitration by the arbitration means and a fourth predetermined period of time has passed since the device apart from the receiver device acquired the use of the receiver bus, a stop signal to the device apart from the receiver device.

11. The bridge device according to claim 10, wherein the stop signal output means outputs, when a further device apart from the receiver device outputs the request signal before the receiver device, the stop signal to the receiver device apart from the receiver device.

12. A bridge device that is installed in a computer system that includes: a sender PCI bus that performs data transfer at a maximum transfer rate equal to a first transfer rate and is connected to a sender device that outputs data; a receiver PCI bus that performs data transfer at a maximum transfer rate equal to the first transfer rate and is connected to a receiver device that receives the data; and arbitration means that performs arbitration between devices when assigning uses of the sender PCI bus and the receiver PCI bus, comprising:

request signal output means for outputting, when the sender device acquires the use of the sender PCI bus, a request signal for requesting the use of the receiver PCI bus to the arbitration means;

transfer rate reduction means for reducing a transfer rate on the sender PCI bus from the first transfer rate to a second transfer rate that is lower than the first transfer rate by outputting a READY signal in which waits are inserted to a sender device;

a buffer for reading and storing data that is transferred via the sender PCI bus;

transfer rate return means for having the transfer rate on the sender PCI bus return from the second transfer rate to the first transfer rate by inserting no wait in the READY signal; and output means for outputting data stored in the buffer to the receiver PCI bus according to a FIFO order.

13. The bridge device according to claim 12, wherein
the sender device includes a storage resource that stores data, and reads data stored in the storage resource and outputs the data to the sender PCI bus when a read command is output, a receiver device outputs a read command, and when data that the read command requests is output to the receiver PCI bus, receives the output data, the bridge device further comprising:
reception means for receiving a read command from the receiver device, the read command identifying the sender device as the data source; and output instructing means for receiving a read command and instructing the sender device to read the data stored in the storage resource and to output the read data to the receiver PCI bus, wherein the request signal output means outputs, when the sender device acquires the use of the sender PCI bus, a request signal for requesting the use of the receiver PCI bus to the arbitration means, and the transfer rate return means that the transfer rate on the sender PCI bus return to the first transfer rate when the bridge device acquires the use of the receiver PCI bus.

14. The bridge device according to claim 12, wherein
the receiver device includes a storage resource in which data is to be written according to a write command, and when a write command in which the receiver device is indicated as a data destination is output, receives data transferred to the receiver PCI bus and writes the transferred data in the storage resource, and the sender device outputs a write command and data that is to be written in the receiver to the sender PCI bus according to the write command simultaneously, the bridge device further comprising:
reception means for receiving a write command from the sender device, the write command indicating the receiver device as the data destination; and output instructing means for receiving a write command and instructing the sender device to read data to be written and to output the read data to the sender PCI bus, wherein the request signal output means outputs, when the sender device acquires the use of the sender PCI bus, a request signal for requesting the use of the receiver PCI bus to the arbitration means, and the transfer rate return means has the transfer rate on the sender PCI bus return to the first transfer rate when the bridge device acquires the use of the receiver PCI bus.

15. A bridge device that is installed in a computer system that includes: a sender device for including a storage resource that stores data, and for reading data stored in the storage resource and for outputting the data to the sender PCI bus when a read command is output; a receiver device for outputting a read command, and when data that the read command requests is output to the receiver PCI bus, for receiving the output data; a sender PCI bus that performs data transfer at a maximum transfer rate equal to a first transfer rate and is connected to a sender device that outputs data; a receiver PCI bus that performs data transfer at a maximum transfer rate equal to the first transfer rate and is connected to a receiver device that receives the data; and arbitration means that performs arbitration between devices when assigning uses of the sender PCI bus and the receiver PCI bus, the bridge device comprising:
  reception means for receiving a read command from the receiver device, the read command identifying the sender device as the data source;
  output instructing means for receiving a read command and instructing the sender device to read the data stored in the storage resource and to output the read data to the receiver PCI bus;
  request signal output means for outputting, when the sender device acquires the use of the sender PCI bus, a request signal for requesting the use of the receiver PCI bus to the arbitration means;
  transfer rate reduction means for reducing a transfer rate on the sender PCI bus from the first transfer rate to a second transfer rate that is lower than the first transfer rate by outputting a READY signal in which waits are inserted to a sender device;
  a buffer for reading and storing data that is transferred via the sender PCI bus;
  transfer rate return means for having the transfer rate on the sender PCI bus return from the second transfer rate to the first transfer rate by inserting no wait in the READY signal; and
  output means for outputting data stored in the buffer to the receiver PCI bus according to a FIFO order.

16. A bridge device that is installed in a computer system that includes: receiver device for including a storage resource in which data is to be written according to a write command, and when a write command in which the receiver device is indicated as a data destination is output, for receiving data transferred to the receiver PCI bus and for writing the transferred data in the storage resource; a sender device for outputting a write command and data that is to be written in the receiver to the sender PCI bus according to the write command simultaneously; a sender PCI bus that performs data transfer at a maximum transfer rate equal to a first transfer rate and is connected to a sender device that outputs data; a receiver PCI bus that performs data transfer at a maximum transfer rate equal to the first transfer rate and is connected to a receiver device that receives the data; and an arbitration means that performs arbitration between devices when assigning uses of the sender PCI bus and the receiver PCI bus, the bridge device comprising:
  reception means for receiving a write command from the sender device, the write command indicting the receiver device as the data destination;
  output instructing means for receiving a write command and instructing the sender device to read data to be written and to output the read data to the sender PCI bus;
  request signal output means for outputting, when the sender device acquires the use of the sender PCI bus, a request signal for requesting the use of the receiver PCI bus to the arbitration means;
  transfer rate reduction means for reducing a transfer rate on the sender PCI bus from the first transfer rate to a second transfer rate that is lower than the first transfer rate by outputting a READY signal in which waits are inserted to a sender device;
  a buffer for reading and storing data that is transferred via the sender PCI bus;
  transfer rate return means for having the transfer rate on the sender PCI bus return from the second transfer rate to the first transfer rate by inserting no wait in the READY signal; and
  output means for outputting data stored in the buffer to the receiver PCI bus according to a FIFO order.

\* \* \* \* \*